US009837663B2

(12) United States Patent
Nagai

(10) Patent No.: US 9,837,663 B2
(45) Date of Patent: *Dec. 5, 2017

(54) LITHIUM-ION SECONDARY BATTERY

(71) Applicant: Toyota Jidosha Kabushiki Kaisha, Toyota-shi (JP)

(72) Inventor: Hiroki Nagai, Nagoya (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 277 days.

This patent is subject to a terminal disclaimer.

(21) Appl. No.: 14/567,310

(22) Filed: Dec. 11, 2014

(65) Prior Publication Data

US 2015/0090929 A1    Apr. 2, 2015

Related U.S. Application Data

(62) Division of application No. 13/807,453, filed as application No. PCT/JP2011/060605 on May 6, 2011, now Pat. No. 8,945,768.

(51) Int. Cl.
*H01M 4/50* (2010.01)
*H01M 4/505* (2010.01)
(Continued)

(52) U.S. Cl.
CPC ............ *H01M 4/505* (2013.01); *C01D 15/02* (2013.01); *H01M 4/131* (2013.01); *H01M 4/366* (2013.01);
(Continued)

(58) Field of Classification Search
CPC ...... H01M 4/505; H01M 4/525; H01M 4/366; H01M 4/5825; H01M 4/131;
(Continued)

(56) References Cited

U.S. PATENT DOCUMENTS 5,677,082 A   10/1997 Greinke et al.
5,702,845 A   12/1997 Kawakami et al.
(Continued)

FOREIGN PATENT DOCUMENTS

CN   102612772   7/2012
JP   10-74516    3/1998
(Continued)

OTHER PUBLICATIONS

Notice of Allowance and Fee(s) Due for U.S. Appl. No. 13/807,453 dated Sep. 12, 2014.
(Continued)

*Primary Examiner* — Stephen Yanchuk
(74) *Attorney, Agent, or Firm* — Finnegan, Henderson, Farabow, Garrett & Dunner, LLP

(57) ABSTRACT

A lithium-ion secondary battery 100 includes a positive electrode current collector 221 and a porous positive electrode active material layer 223 retained by the positive electrode current collector 221. The positive electrode active material layer 223 contains, for example, positive electrode active material particles 610, an electrically conductive material 620, and a binder 630. In this lithium-ion secondary battery 100, the positive electrode active material particles 610 have a shell portion 612 constituted by a lithium transition metal oxide, a hollow portion 614 formed inside the shell portion 612, and a through hole 616 penetrating the shell portion 612. In the lithium-ion secondary battery 100, in the positive electrode active material layer 223 on average, the hollow portion 614 accounts for 23% or higher of an apparent sectional area of the positive electrode active material particles 610. In addition, a thickness of the shell portion 612 in the positive electrode active material layer 223 on average is 2.2 μm or less.

3 Claims, 11 Drawing Sheets

(51) Int. Cl.
*H01M 4/131* (2010.01)
*H01M 10/0525* (2010.01)
*C01D 15/02* (2006.01)
*H01M 4/36* (2006.01)
*H01M 4/525* (2010.01)
*H01M 4/58* (2010.01)
*H01M 4/02* (2006.01)

(52) U.S. Cl.
CPC ......... *H01M 4/525* (2013.01); *H01M 4/5825* (2013.01); *H01M 10/0525* (2013.01); *H01M 2004/021* (2013.01); *H01M 2220/20* (2013.01); *Y02E 60/122* (2013.01); *Y02P 70/54* (2015.11); *Y02T 10/7011* (2013.01)

(58) Field of Classification Search
CPC ........ H01M 10/0525; H01M 2004/021; C01G 53/006; C01G 53/50; C01D 15/02; C01P 2002/52; C01P 2002/03; C01P 2002/61; C01P 2002/11; C01P 2002/12; C01P 2002/16; Y02E 60/122; Y02T 10/7011; Y02P 70/54
See application file for complete search history.

(56) References Cited

U.S. PATENT DOCUMENTS

| | | | |
|---|---|---|---|
| 6,255,020 B1 | 7/2001 | Yamashita et al. | |
| 9,184,442 B2 * | 11/2015 | Nagai | H01M 4/131 |
| 9,209,459 B2 * | 12/2015 | Nagai | H01M 4/131 |
| 9,356,289 B2 * | 5/2016 | Nagai | H01M 4/13 |
| 9,553,310 B2 * | 1/2017 | Nagai | H01M 4/131 |
| 2002/0028380 A1 | 3/2002 | Tanjo et al. | |
| 2005/0221182 A1 | 10/2005 | Fujiwara et al. | |
| 2006/0134521 A1 | 6/2006 | Shima | |
| 2007/0003835 A1 | 1/2007 | Hasegawa et al. | |
| 2008/0241701 A1 | 10/2008 | Okumura et al. | |
| 2009/0317637 A1 | 12/2009 | Luhrs et al. | |
| 2010/0068610 A1 | 3/2010 | Sudworth | |
| 2012/0282525 A1 | 11/2012 | Nagai et al. | |

FOREIGN PATENT DOCUMENTS

| | | |
|---|---|---|
| JP | 10-255763 | 9/1998 |
| JP | 10-321227 | 12/1998 |
| JP | 11-031534 | 2/1999 |
| JP | 2000-323123 | 11/2000 |
| JP | 2000-340226 | 12/2000 |
| JP | 2001-110424 | 4/2001 |
| JP | 2001-332246 | 11/2001 |
| JP | 2002-75365 | 3/2002 |
| JP | 2002-203603 | 7/2002 |
| JP | 2003-272609 | 9/2003 |
| JP | 2004-253174 | 9/2004 |
| JP | 2004-288644 | 10/2004 |
| JP | 2005-044722 | 2/2005 |
| JP | 2005-158623 | 6/2005 |
| JP | 2005-285606 | 10/2005 |
| JP | 2007-42579 | 2/2007 |
| JP | 2007-109636 | 4/2007 |
| JP | 4096754 | 3/2008 |
| JP | 2009-123671 | 6/2009 |
| JP | 2009-129889 | 6/2009 |
| JP | 2010-015904 | 1/2010 |
| JP | 2010-097813 | 4/2010 |
| JP | 2011-119092 | 6/2011 |
| JP | 4840545 | 10/2011 |
| JP | 4915488 | 2/2012 |
| WO | WO 2012/063369 | 5/2012 |

OTHER PUBLICATIONS

Restriction Requirement for U.S. Appl. No. 13/884,628 dated Jan. 16, 2015.
Office Action for U.S. Appl. No. 13/884,628 dated Mar. 12, 2015.
Notice of Allowance for U.S. Appl. No. 13/884,628 dated Jul. 9, 2015.
Office Action for U.S. Appl. No. 13/884,645 dated Mar. 10, 2015.
Office Action for U.S. Appl. No. 13/884,645 dated Aug. 17, 2015.
Notice of Allowance for U.S. Appl. No. 13/884,645 dated Feb. 17, 2016.
Office Action for U.S. Appl. No. 13/879,105 dated Apr. 1, 2015.
Office Action for U.S. Appl. No. 13/879,105 dated Aug. 14, 2015.
Office Action for U.S. Appl. No. 13/879,105 dated Mar. 11, 2016.
Notice of Allowance for U.S. Appl. No. 13/879,105 dated Sep. 14, 2016.
Office Action for U.S. Appl. No. 13/879,042 dated Mar. 9, 2015.
Notice of Allowance for U.S. Appl. No. 13/879,042 dated Aug. 7, 2015.

* cited by examiner

LITHIUM-ION SECONDARY BATTERY

TECHNICAL FIELD

The present invention relates to a lithium-ion secondary battery. In the present description, "lithium-ion secondary battery" refers to a secondary battery which uses lithium ions as electrolyte ions and in which charging and discharging are realized by the transfer of charges accompanying lithium ions between a positive electrode and a negative electrode. In the present description, "secondary battery" includes repetitively chargeable storage devices in general.

BACKGROUND ART

For example, Japanese Patent Publication No. 4096754 discloses a positive electrode active material of a lithium-ion secondary battery.

The positive electrode active material disclosed in the literature above contains a lithium-nickel complex oxide with a layered structure. In this case, the lithium-nickel complex oxide with a layered structure is obtained by calcining a raw material mixture composed of a heat-treated product of a coprecipitate obtained by precipitating sodium hydroxide on a water-based solution containing cobalt ions, nickel ions, or aluminum ions at a predetermined composition ratio and a lithium compound. The lithium-nickel complex oxide is represented by the following general formula. General formula: $Li_kNi_mCo_pAl_{(1-m-p)}O_r$ (where k, m, p, and r respectively satisfy $0.95 \leq k \leq 1.10$, $0.1 \leq m \leq 0.9$, $0.1 \leq p \leq 0.9$, and $1.8 \leq r \leq 2.2$), and Ni/Co (molar ratio) is any of 2.33, 3.0, 3.25, and 3.5. The lithium-nickel complex oxide disclosed in the literature above is a hollow particle comprising an outer shell portion on the outside and a space portion inside the outer shell portion. In addition, a ratio of a surface area of the space portion to a total surface area of the outer shell portion and the space portion in a processed profile of the hollow particle is within a range of 7% to 16%.

CITATION LIST

Patent Literature

Patent Literature 1: Japanese Patent Publication No. 4096754

SUMMARY OF INVENTION

A vehicle in which wheels are driven by an electric motor such as co-called hybrid vehicles (including plug-in hybrid vehicles) and electric cars is capable of running by only using power stored in a battery. An output of a battery tends to decline as an amount of charge decreases. To ensure that a vehicle runs stably, the battery is desirably used within a predetermined amount-of-charge range. If the battery mounted on this vehicle is capable of producing a required output even at a low amount of charge (even when the amount of charge is low), a traveling performance of a hybrid vehicle, an electrical car, or the like can be improved. In addition, if a required output can be produced even at a low amount of charge (even when the amount of charge is low), the number of batteries used to secure a necessary amount of energy can be reduced and cost reduction can be achieved.

A lithium-ion secondary battery proposed by the present inventors has a current collector and a porous positive electrode active material layer which is retained by the current collector and which contains positive electrode active material particles, an electrically conductive material, and a binder. The positive electrode active material particles have a shell portion constituted by a lithium transition metal oxide, a hollow portion formed inside the shell portion, and a through hole that penetrates the shell portion. In addition, in the positive electrode active material layer on average, the hollow portion accounts for 23% or higher of an apparent sectional area of the positive electrode active material particles, and a thickness of the shell portion in the positive electrode active material layer on average is 2.2 μm or less. In this case, on any cross section of the positive electrode active material layer, a thickness of the shell portion at any position on an inner surface of the shell portion is defined as a shortest distance from the arbitrary position on the inner surface of the shell portion to an outer surface of the shell portion.

Generally, since a lithium ion concentration in the positive electrode active material layer increases significantly at a low amount of charge, diffusion of ions to the inside of the positive electrode active material during discharging is subjected to rate limitation. With the lithium-ion secondary battery according to the present invention, in the positive electrode active material layer on average, the ratio of the hollow portion among the apparent sectional area of the positive electrode active material particles is 23% or higher, the positive electrode active material particles have a through hole penetrating the shell portion, and a thickness of the shell portion of the positive electrode active material particles is extremely thin (in this case, 2.2 μm or less). Therefore, lithium ions diffuse rapidly into the shell portion (inside of the active material) of the positive electrode active material particles. As a result, the lithium-ion secondary battery can stably produce high output even when the amount of charge is low.

Furthermore, in the positive electrode active material layer on average, the thickness of the shell portion may be 0.05 μm or more. Accordingly, necessary durability is secured for the positive electrode active material particles and the performance of the lithium-ion secondary battery stabilizes.

Moreover, the lithium transition metal oxide constituting the shell portion of the positive electrode active material particles may be a compound which has a layered structure and which contains nickel as a constituent element. This lithium transition metal oxide may be, for example, a compound which has a layered structure and which contains nickel, cobalt, and manganese as constituent elements. Alternatively, the lithium transition metal oxide may be a compound which has a layered structure and which is expressed as $Li_{1+x}Ni_yCo_zMn_{(1-y-z)}M_yO_2$, where $0 \leq x \leq 0.2$, $0.1 < y < 0.9$, $0.1 < z < 0.4$, M denotes an additive, and $0 \leq y \leq 0.01$. Furthermore, M as the additive may be at least one additive selected from the group consisting of Zr, W, Mg, Ca, Na, Fe, Cr, Zn, Si, Sn, Al, B, and F.

Furthermore, the positive electrode active material particles may be positive electrode active material particles produced by a production method comprising: a raw material hydroxide formation step of supplying ammonium ions to an aqueous solution of a transition metal compound, and precipitating particles of the transition metal hydroxide from the aqueous solution; a mixing step of mixing the transition metal hydroxide with a lithium compound to prepare an unfired mixture; and a calcining step of calcining the mixture to obtain the active material particles. Moreover, in this case, the aqueous solution may contain at least one transition metal element that composes the lithium transition metal oxide.

In addition, the raw material hydroxide formation step may include a nucleation stage in which the transition metal hydroxide is precipitated from the aqueous solution and a particle growth stage in which the transition metal hydroxide is grown in a state where a pH of the aqueous solution is lowered from the nucleation stage. In this case, the pH of the aqueous solution in the nucleation stage may be 12 to 13, and the pH of the aqueous solution in the particle growth stage may be 11 or higher and lower than 12. Furthermore, an ammonium ion concentration in the aqueous solution in the nucleation stage may be 20 g/L or lower, and the ammonium ion concentration in the aqueous solution in the particle growth stage may be 10 g/L or lower. Moreover, the ammonium ion concentration of the aqueous solution in the nucleation stage and the particle growth stage may be 3 g/L or higher. Accordingly, positive electrode active material particles having a thin shell portion, a spacious hollow portion, and having a through hole can be obtained more stably.

DESCRIPTION OF EMBODIMENTS

Figure 1:
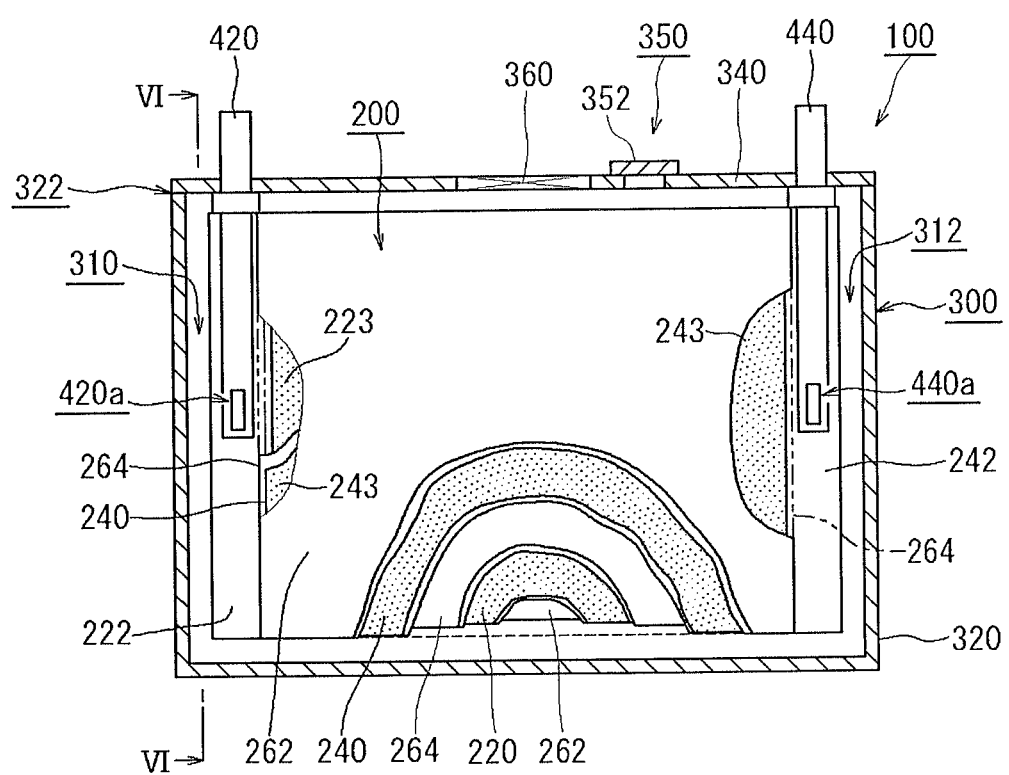
FIG. 1 is a diagram showing an example of a structure of a lithium-ion secondary battery.

First, an example of a structure of a lithium-ion secondary battery will be described. Subsequently, while referring to this structure example as appropriate, a lithium-ion secondary battery according to an embodiment of the present invention will be described. Members and portions that produce same effects are denoted by same reference characters as appropriate. In addition, it will be recognized that the respective drawings have been schematically rendered and therefore may not necessarily reflect actual elements shown. The respective drawings merely show one example and do not limit the present invention thereto unless specifically mentioned otherwise.

Figure 2:
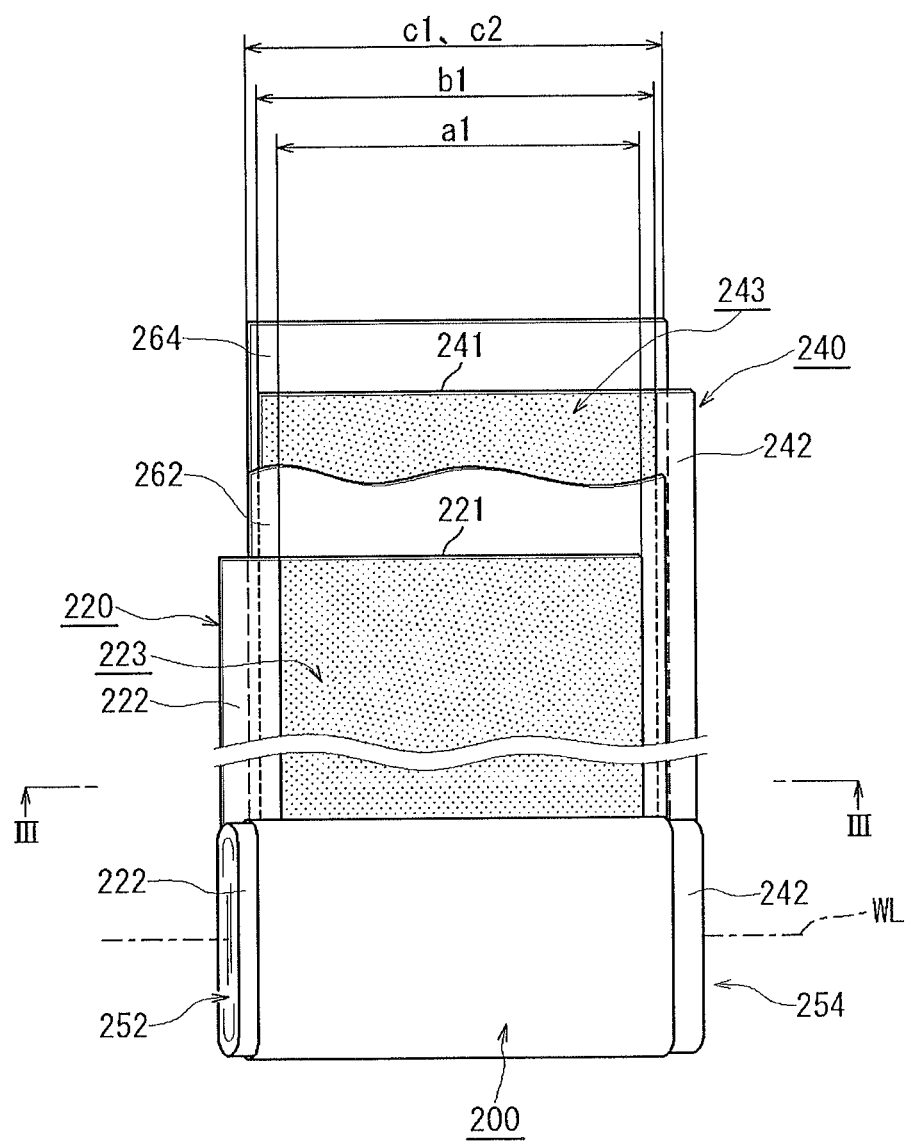
FIG. 2 is a diagram showing a wound electrode body of a lithium-ion secondary battery.
Figure 3:
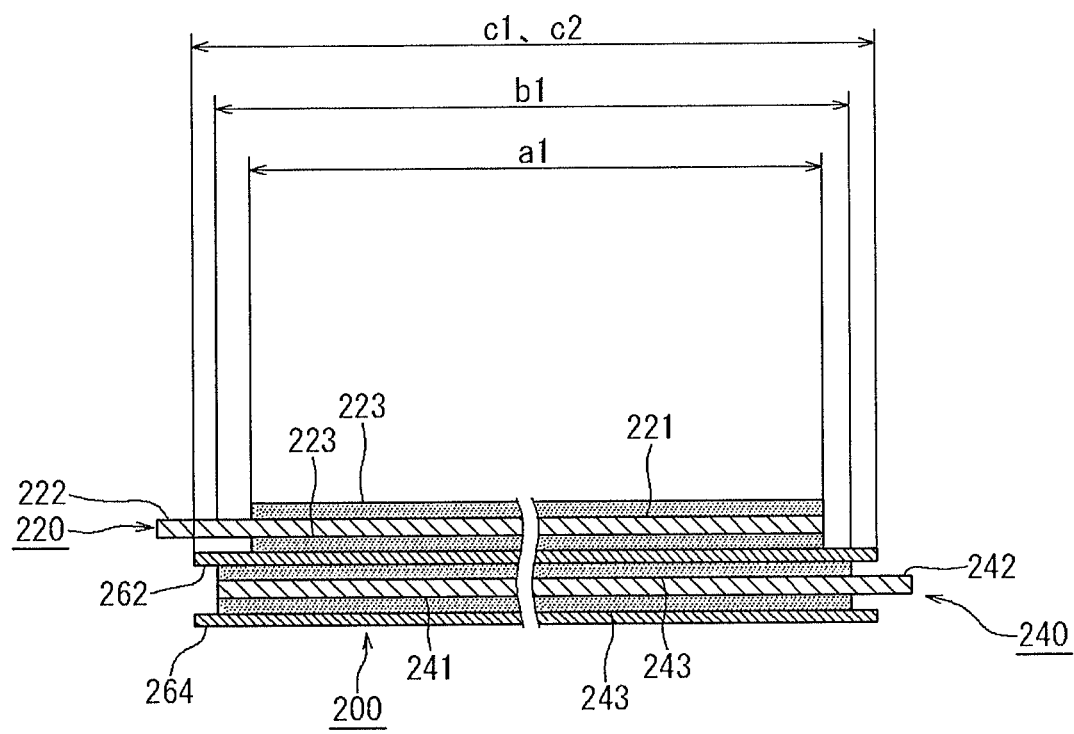
FIG. 3 is a sectional view showing a cross-section taken along line III-III in FIG. 2.

FIG. 1 shows a lithium-ion secondary battery 100. As shown in FIG. 1, the lithium-ion secondary battery 100 comprises a wound electrode body 200 and a battery case 300. FIG. 2 is a diagram showing the wound electrode body 200. FIG. 3 shows a cross-section taken along line III-III in FIG. 2.

As shown in FIG. 2, the wound electrode body 200 comprises a positive electrode sheet 220, a negative electrode sheet 240, and separators 262 and 264. The positive electrode sheet 220, the negative electrode sheet 240, and the separators 262 and 264 are respectively band-like sheet materials.

<Positive Electrode Sheet 220>

The positive electrode sheet 220 comprises a band-like positive electrode current collector 221 and a positive electrode active material layer 223. A metallic foil suitable for a positive electrode may be used as the positive electrode current collector 221. For example, a band-like aluminum foil having a predetermined width and a thickness of approximately 15 μm can be used as the positive electrode current collector 221. An uncoated portion 222 is set along one width-direction edge of the positive electrode current collector 221. In the illustrated example, as shown in FIG. 3, with the exception of the uncoated portion 222 set on the positive electrode current collector 221, the positive electrode active material layer 223 is retained on both surfaces of the positive electrode current collector 221. The positive electrode active material layer 223 contains positive electrode active material. The positive electrode active material layer 223 is formed by coating a positive electrode mixture containing the positive electrode active material onto the positive electrode current collector 221.

<Positive Electrode Active Material Layer 223 and Positive Electrode Active Material Particles 610>

Figure 4:
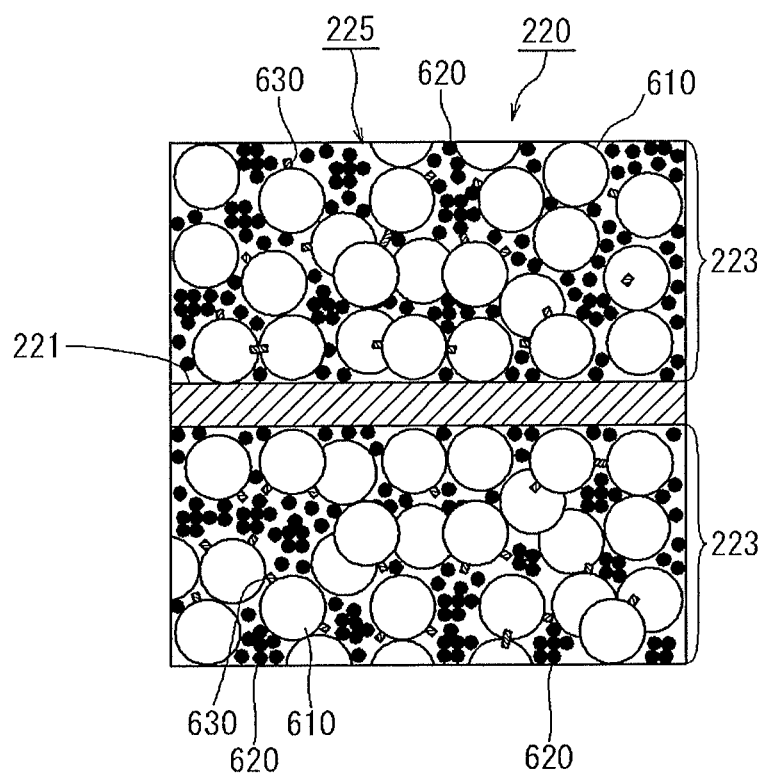
FIG. 4 is a sectional view showing a structure of a positive electrode active material layer.

FIG. 4 is a sectional view of the positive electrode sheet 220. Moreover, in FIG. 4, positive electrode active material particles 610, an electrically conductive material 620, and a binder 630 in the positive electrode active material layer 223 are schematically depicted enlarged so as to clarify the structure of the positive electrode active material layer 223. As shown in FIG. 4, the positive electrode active material layer 223 contains the positive electrode active material particles 610, the electrically conductive material 620, and the binder 630.

A material used as a positive electrode active material of a lithium-ion secondary battery can be used as the positive electrode active material 610. Examples of a positive electrode active material 610 include lithium transition metal oxides such as $LiNiCoMnO_2$ (lithium-nickel-cobalt-manganese complex oxide), $LiNiO_2$ (lithium nickelate), $LiCoO_2$ (lithium cobaltate), $LiMn_2O_4$ (lithium manganate), and $LiFePO_4$ (iron lithium phosphate). For example, $LiMn_2O_4$ has a spinel structure. In addition, $LiNiO_2$ and $LiCoO_2$ have a layered evaporitic structure. Furthermore, for example, $LiFePO_4$ has an olivine structure. $LiFePO_4$ having an olivine structure includes, for example, particles in the order of nanometers. In addition, $LiFePO_4$ having an olivine structure can be further coated by a carbon film.

<Electrically Conductive Material 620>

Examples of the electrically conductive material 620 include carbon materials such as carbon powders and carbon fibers. One type of material selected from such electrically conductive materials may be used alone or two or more types may be used in combination. Examples of carbon powders that can be used include various types of carbon black (such as acetylene black, oil furnace black, graphitized carbon black, carbon black, graphite, and Ketjen black) and graphite powder.

<Binder 630>

In addition, the binder 630 binds respective the positive electrode active material particles 610 and the particles of the electrically conductive material 620 contained in the positive electrode active material layer 223 with each other, and binds these particles and the positive electrode current collector 221 with each other. For this binder 630, a polymer can be used which is dissolvable or dispersible in the solvent used. For example, in a positive electrode mixture composition that uses an aqueous solvent, a water-soluble or water-dispersible polymer can be used favorably, examples of which include: cellulose-based polymers (such as carboxymethyl cellulose (CMC) and hydroxypropyl methyl cellulose (HPMC)); fluorine-based resins (for example, polyvinyl alcohol (PVA), polytetrafluoroethylene (PTFE), and tetrafluoroethylene-hexafluoropropylene copolymer (FEP)); and rubbers (such as vinyl acetate copolymers, styrene butadiene copolymers (SBR), and acrylic acid-modified SBR resins (SBR latex)). In addition, in a positive electrode mixture composition that uses a non-aqueous solvent, polymers (such as polyvinylidene fluoride (PVDF), polyvinylidene chloride (PVDC), and polyacrylonitrile (PAN)) can favorably be used.

<Thickener, Solvent>

The positive electrode active material layer 223 is formed by, for example, preparing a positive electrode mixture in which the positive electrode active material particles 610 and the electrically conductive material 620 described above are mixed into a solvent to a paste form (slurry), coating the positive electrode current collector 221 with the positive electrode mixture, and subsequently performing drying and rolling. In doing so, any aqueous solvent or non-aqueous solvent can be used for the solvent of the positive electrode mixture. A preferable example of a non-aqueous solvent is N-methyl-2-pyrrolidone (NMP). The above-mentioned polymer materials exemplified as the binder 630 can also be used for the purpose of demonstrating a function as a thickener or another additive of the positive electrode mixture in addition to functioning as a binder.

A weight ratio of the positive electrode active material in the entire positive electrode mixture is favorably approximately 50% by weight or more (and typically 50 to 95% by weight), and normally the ratio is more favorably approximately 70 to 95% by weight (for example, 75 to 90% by weight). In addition, the ratio of the electrically conductive material in the entire positive electrode mixture can favorably be, for example, approximately 2 to 20% by weight, and normally the ratio is favorably approximately 2 to 15% by weight. In a composition that uses a binder, the ratio of the binder in the entire positive electrode mixture can be, for example, approximately 1 to 10% by weight, and normally the ratio is favorably approximately 2 to 5% by weight.

<Negative Electrode Sheet 240>

As shown in FIG. 2, the negative electrode sheet 240 comprises a band-like negative electrode current collector 241 and a negative electrode active material layer 243. A metallic foil suitable for a negative electrode may be preferably used as the negative electrode current collector 241. A band-like copper foil having a predetermined width and a thickness of approximately 10 μm is used as the negative electrode current collector 241. An uncoated portion 242 is set along one width-direction edge of the negative electrode current collector 241. With the exception of the uncoated portion 242 set on the negative electrode current collector 241, the negative electrode active material layer 243 is formed on both surfaces of the negative electrode current collector 241. The negative electrode active material layer 243 is retained by the negative electrode current collector 241 and at least contains negative electrode active material. For the negative electrode active material layer 243, a negative electrode mixture containing the negative electrode active material is coated on the negative electrode current collector 241.

<Negative Electrode Active Material Layer 243>

Figure 5:
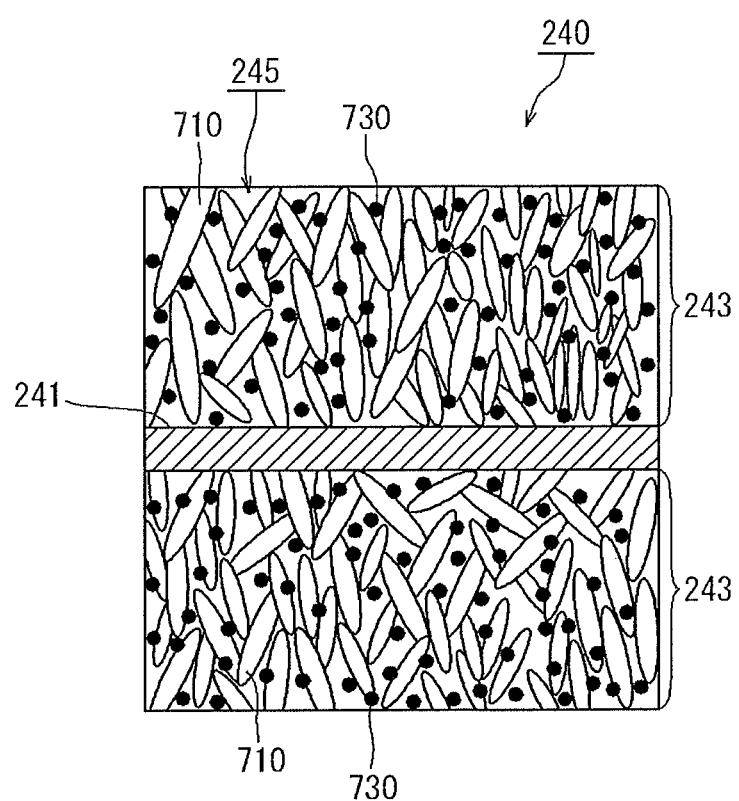
FIG. 5 is a sectional view showing a structure of a negative electrode active material layer.

FIG. 5 is a sectional view of the negative electrode sheet 240 of the lithium-ion secondary battery 100. As shown in FIG. 5, the negative electrode active material layer 243 contains a negative electrode active material 710, a thickener (not shown), a binder 730, and the like. In FIG. 5, the negative electrode active material 710 and the binder 730 in the negative electrode active material layer 243 are schematically depicted enlarged so as to clarify the structure of the negative electrode active material layer 243.

<Negative Electrode Active Material>

Furthermore, one type or two or more types of materials conventionally used in lithium-ion secondary batteries can be used without particular limitation for the negative electrode active material 710. Examples of these materials include particulate carbon materials (carbon powder) containing a graphite structure (a layered structure) in at least a portion thereof. More specifically, the negative electrode active material may be, for example, natural graphite, natural graphite coated with an amorphous carbon material, a carbon material having a graphitic structure (graphite), a carbon material having a non-graphitizable carbonaceous structure (hard carbon), a carbon material having a graphitizable carbonaceous structure (soft carbon), or a combination thereof. Moreover, while a case where a so-called flake graphite is used as the negative electrode active material 710 has been illustrated, the negative electrode active material 710 is not limited to the illustrated example.

<Thickener, Solvent>

The negative electrode active material layer 243 is formed by, for example, preparing a negative electrode mixture in which the negative electrode active material 710 and the binder 730 described above are mixed into a solvent to a paste form (slurry), coating the negative electrode current collector 241 with the negative electrode mixture, and subsequently performing drying and rolling. In doing so, any aqueous solvent or non-aqueous solvent can be used for the solvent of the negative electrode mixture. A preferable example of a non-aqueous solvent is N-methyl-2-pyrrolidone (NMP). For the binder 730, polymer materials exemplified as the binder 630 of the positive electrode active material layer 223 (refer to FIG. 4) described earlier can be used. In addition, the above-mentioned polymer materials exemplified as the binder 630 of the positive electrode active material layer 223 can also be used for the purpose of demonstrating a function as a thickener or another additive of the positive electrode mixture in addition to functioning as a binder.

<Separators 262 and 264>

As shown in FIGS. 1 and 2, the separators 262 and 264 are members that separate the positive electrode sheet 220 and the negative electrode sheet 240 from each other. In this example, the separators 262 and 264 are constituted by band-like sheet members with a predetermined width which include a plurality of minute holes. For example, a separator which is made of a porous polyolefin-based resin and which has a single-layer structure or a laminated structure can be used as the separators 262 and 264. In this example, as shown in FIGS. 2 and 3, a width b1 of the negative electrode active material layer 243 is slightly wider than a width a1 of the positive electrode active material layer 223. Furthermore, widths c1 and c2 of the separators 262 and 264 are slightly wider than the width b1 of the negative electrode active material layer 243 (c1, c2>b1>a1).

Moreover, in the example shown in FIGS. 1 and 2, the separators 262 and 264 are constituted by sheet-shaped members. The separators 262 and 264 may be a member which insulates the positive electrode active material layer 223 and the negative electrode active material layer 243 from each other and which allows transfer of an electrolyte. Therefore, the separators 262 and 264 are not limited to sheet-shaped members. Instead of sheet-shaped members, the separators 262 and 264 may be constituted by, for example, a layer of particles which have insulating properties and which are formed on a surface of the positive electrode active material layer 223 or the negative electrode active material layer 243. In this case, the particles having insulating properties may be constituted by an inorganic filler (for example, a filler such as a metal oxide or a metal hydroxide) having insulating properties or resin particles (for example, particles of polyethylene or polypropylene) having insulating properties.

<Battery Case 300>

Furthermore, in this example, as shown in FIG. 1, the battery case 300 is a so-called square battery case and comprises a container main body 320 and a lid 340. The container main body 320 has a bottomed square tube shape and is a flat box-shaped container with one side surface (upper surface) opened. The lid 340 is a member which is attached to the opening (upper surface opening) of the container main body 320 and which blocks the opening.

With a vehicle-mounted secondary battery, weight energy efficiency (capacity of battery per unit weight) is desirably improved in order to improve fuel efficiency of the vehicle. Therefore, in the present embodiment, a light-weight metal such as aluminum or an aluminum alloy is adopted as the container main body 320 and the lid 340 constituting the battery case 300. Accordingly, weight energy efficiency can be improved.

The battery case 300 has a flat rectangular inner space as a space for housing the wound electrode body 200. In addition, as shown in FIG. 1, a width of the flat inner space of the battery case 300 is slightly greater than the wound electrode body 200. In the present embodiment, the battery case 300 comprises the container main body 320 having a bottomed square tube shape and the lid 340 that blocks the opening of the container main body 320. Furthermore, electrode terminals 420 and 440 are attached to the lid 340 of the battery case 300. The electrode terminals 420 and 440 penetrate the battery case 300 (the lid 340) and reach the outside of the battery case 300. Moreover, an inlet 350 and a safety valve 360 are provided on the lid 340.

Figure 6:
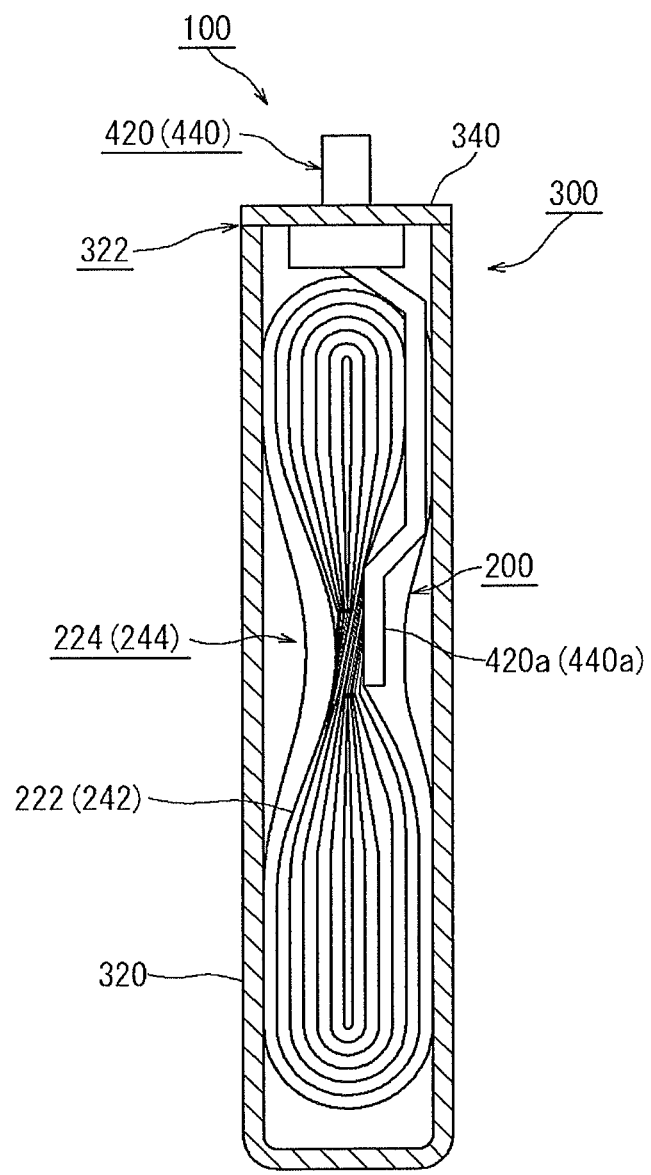
FIG. 6 is a side view showing a welding location of an uncoated portion and an electrode terminal of a wound electrode body.

As shown in FIG. 2, the wound electrode body 200 is flatly deformed in one direction that is perpendicular to a winding axis WL. In the example shown in FIG. 2, on both sides of the separators 262 and 264, the uncoated portion 222 of the positive electrode current collector 221 and the uncoated portion 242 of the negative electrode current collector 241 are respectively spirally exposed. As shown in FIG. 6, in the present embodiment, intermediate portions 224 and 244 of the uncoated portions 222 and 242 are assembled and respectively welded to tips 420*a* and 440*a* of the electrode terminals 420 and 440. When doing so, due to differences in the respective materials, for example, ultrasonic welding is used to weld the electrode terminal 420 and the positive electrode current collector 221 to each other. In addition, for example, resistance welding is used to weld the electrode terminal 440 and the negative electrode current collector 241 to each other. Here, FIG. 6 is a side view showing a welding location of the intermediate portion 224 (244) of the uncoated portion 222 (242) and the electrode terminal 420 (440) of the wound electrode body 200 and is a sectional view taken along VI-VI in FIG. 1.

The wound electrode body 200 is attached to the electrode terminals 420 and 440 fixed to the lid 340 in a state where the wound electrode body 200 is pressed and bent flat. As shown in FIG. 1, this wound electrode body 200 is housed in the flat inner space of the container main body 320. After the wound electrode body 200 is housed, the container main body 320 is blocked by the lid 340. A joint 322 (refer to FIG. 1) of the lid 340 and the container main body 320 is welded and sealed by, for example, laser welding. As described above, in this example, the wound electrode body 200 is positioned inside the battery case 300 by the electrode terminals 420 and 440 fixed to the lid 340 (the battery case 300).

Electrolyte Solution>

Subsequently, an electrolyte solution is injected into the battery case 300 from the inlet 350 provided on the lid 340. A so-called non-aqueous electrolyte solution which does not use water as a solvent is used as the electrolyte solution. In this example, as the electrolyte solution, an electrolyte solution in which $LiPF_6$ is contained at a concentration of approximately 1 mol/liter in a mixed solvent of ethylene carbonate and diethyl carbonate (for example, a mixed solvent with a volume ratio of around 1:1) is used. Subsequently, a metallic sealing cap 352 is attached (for example, welded) to the inlet 350 to seal the battery case 300. Moreover, the electrolyte solution is not limited to the electrolyte solution exemplified herein. For example, non-aqueous electrolyte solutions conventionally used in lithium-ion secondary batteries may be used as appropriate.

<Holes>

The positive electrode active material layer 223 has minute gaps 225 which may be described as cavities between, for example, the positive electrode active material particles 610 and particles of the electrically conductive material 620 (refer to FIG. 4). An electrolyte solution (not shown) penetrates into the minute gaps of this positive electrode active material layer 223. In addition, the negative electrode active material layer 243 has minute gaps 245 which may be described as cavities between, for example, particles of the negative electrode active material 710 (refer to FIG. 5). Here, these gaps 225 and 245 (cavities) will be referred to as "holes" when appropriate. In addition, with the wound electrode body 200, the uncoated portions 222 and 242 are spirally wound on both sides along the winding axis WL as shown in FIG. 2. An electrolyte solution may penetrate from gaps of the uncoated portions 222 and 242 on both sides 252 and 254 along this winding axis WL. As a result, the electrolyte solution penetrates into the positive electrode active material layer 223 and the negative electrode active material layer 243 inside the lithium-ion secondary battery 100.

<Outgassing Path>

In addition, in this example, the flat inner space of the battery case 300 is slightly wider than the flatly-deformed wound electrode body 200. Gaps 310 and 312 are provided on both sides of the wound electrode body 200 between the wound electrode body 200 and the battery case 300. The gaps 310 and 312 act as outgassing paths.

In this lithium-ion secondary battery 100, the positive electrode current collector 221 and the negative electrode current collector 241 are electrically connected to an external device through the electrode terminals 420 and 440 which penetrate the battery case 300. Operations of the lithium-ion secondary battery 100 during charging and discharging will now be described.

<Operation During Charging>

Figure 7:
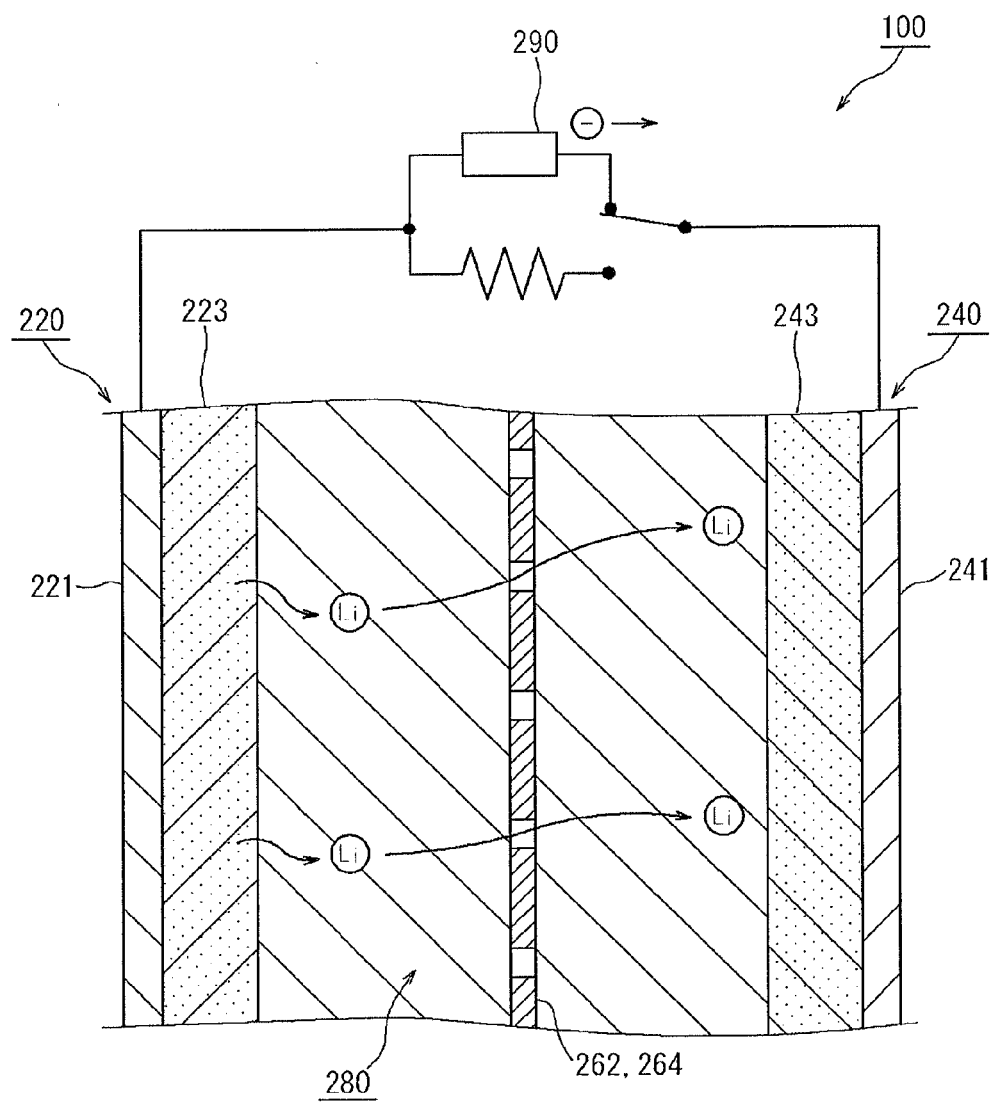
FIG. 7 is a diagram schematically showing a state during charging of a lithium-ion secondary battery.

FIG. 7 schematically shows a state of this lithium-ion secondary battery 100 during charging. During charging, as shown in FIG. 7, the electrode terminals 420 and 440 (refer to FIG. 1) of the lithium-ion secondary battery 100 are connected to a charger 290. Due to the effect of the charger 290, during charging, lithium ions (Li) are released from the positive electrode active material in the positive electrode active material layer 223 into the electrolyte solution 280. At the same time, an electric charge is released from the positive electrode active material layer 223. The released electric charge is sent to the positive electrode current collector 221 via the electrically conductive material (not shown), and are further sent to the negative electrode 240 via the charger 290. Meanwhile, at the negative electrode 240, an electric charge is stored and, at the same time, the lithium ions (Li) in the electrolyte solution 280 are adsorbed and stored by the negative electrode active material in the negative electrode active material layer 243.

<Operation During Discharging>

Figure 8:
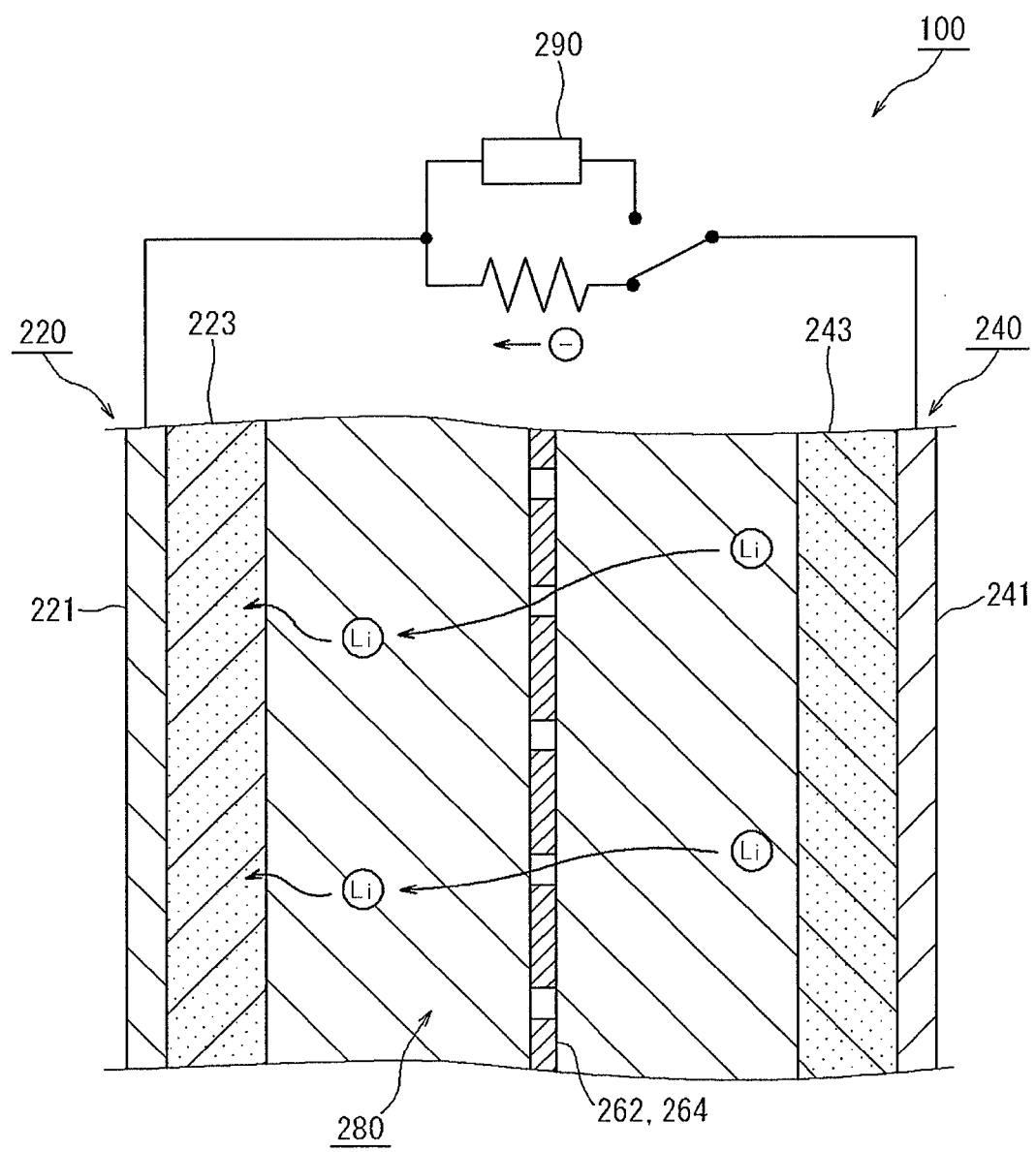
FIG. 8 is a diagram schematically showing a state during discharging of a lithium-ion secondary battery.

FIG. 8 schematically shows a state of this lithium-ion secondary battery 100 during discharging. During discharging, as shown in FIG. 8, an electric charge is sent from the negative electrode sheet 240 to the positive electrode sheet 220 and, at the same time, lithium ions stored in the negative electrode active material layer 243 are released into the electrolyte solution 280. In addition, at the positive electrode, the lithium ions in the electrolyte solution 280 are absorbed by the positive electrode active material in the positive electrode active material layer 223.

In this manner, during charging and discharging of the lithium-ion secondary battery 100, lithium ions migrate between the positive electrode active material layer 223 and the negative electrode active material layer 243 via the electrolyte solution 280. In addition, during charging, an electric charge is sent from the positive electrode active material to the positive electrode current collector 221 via the electrically conductive material. In contrast, during discharging, an electric charge is returned from the positive electrode current collector 221 to the positive electrode active material via the electrically conductive material.

During charging, conceivably, the smoother the migration of the lithium ions and the transfer of electrons, the higher the efficiency and the speed of charging that can be performed. During discharging, conceivably, the smoother the migration of the lithium ions and the transfer of electrons, the lower the resistance of the battery and the greater the discharge capacity, which results in improved battery output.

<Other Battery Modes>

Moreover, the above description represents an example of a lithium-ion secondary battery. However, lithium-ion secondary batteries are not limited to the mode described above. Similarly, an electrode sheet obtained by coating a metallic foil with an electrode mixture may be used in various other battery modes. For example, a cylindrical battery and a laminated battery are known as other battery modes. A cylindrical battery is a battery in which a wound electrode body is housed in a cylindrical battery case. In addition, a laminated battery is a battery in which a positive electrode sheet and a negative electrode sheet are laminated with a separator interposed between the positive electrode sheet and the negative electrode sheet Moreover, while the lithium-ion secondary battery 100 is exemplified above, secondary batteries other than a lithium-ion secondary battery may also adopt similar structures.

Hereinafter, a lithium-ion secondary battery according to an embodiment of the present invention will be described. Moreover, since the lithium-ion secondary battery described below has a same basic structure as the lithium-ion secondary battery 100 described above, reference will be made to the drawings of the lithium-ion secondary battery 100 described above as appropriate for the following description.

As shown in FIG. 1, the lithium-ion secondary battery 100 comprises the positive electrode current collector 221 and the porous positive electrode active material layer 223. As shown in FIG. 5, the positive electrode active material layer 223 is retained by the positive electrode current collector 221 and contains the positive electrode active material particles 610 (positive electrode active material), the electrically conductive material 620, and the binder 630.

<Positive Electrode Active Material Particles 610>

Figure 9:
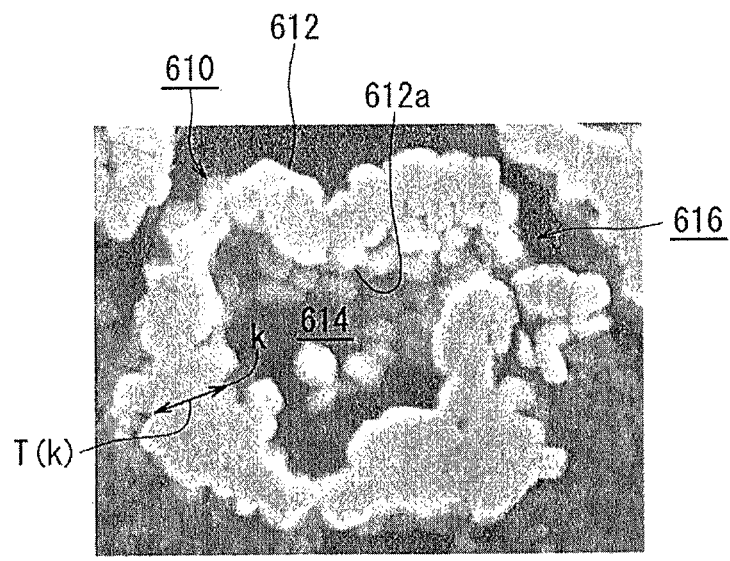
FIG. 9 is a diagram showing positive electrode active material particles.

As shown in FIG. 9, the positive electrode active material particles 610 comprise a shell portion 612 constituted by a lithium transition metal oxide, a hollow portion 614 formed inside the shell portion 612, and a through hole 616 penetrating the shell portion 612. Moreover, in this case, a portion corresponding to the through hole 616 of the positive electrode active material particles 610 among an inner surface 612a of the shell portion 612 is not included in the inner surface 612a of the shell portion 612. In addition, the through hole 616 is not included in the hollow portion 614 of the positive electrode active material particles 610.

In the lithium-ion secondary battery 100, in the positive electrode active material layer 223 on average, a ratio of the hollow portion 614 among an apparent sectional area of the positive electrode active material particles 610 is 23% or higher. Furthermore, on an arbitrary cross section of the positive electrode active material layer 223, a thickness T(k) of the shell portion 612 at an arbitrary position k on the inner surface of the shell portion 612 is assumed to be a shortest distance T(k) from the arbitrary position k to an outer surface of the shell portion 612. In this case, in the lithium-ion secondary battery 100, a thickness T of the shell portion 612 on an arbitrary cross section of the positive electrode active material layer 223 on average is 2.2 μm or less. Here, an "apparent sectional area of the positive electrode active material particles 610" is a sectional area of the positive electrode active material particles 610 including the hollow portion.

<Ratio of Hollow Portion 614:Particle Porosity>

The ratio of the hollow portion 614 among the apparent sectional area of the positive electrode active material particles 610 can be ascertained based on sectional SEM images of the positive electrode active material layer 223. With a sectional SEM image of the positive electrode active material layer 223, as shown in FIG. 9, the shell portion 612, the hollow portion 614, and the through hole 616 of the positive electrode active material particles 610 can be distinguished based on differences in tonality and grayscale among the sectional SEM image of the positive electrode active material layer 223.

In addition, based on an arbitrary sectional SEM image of the positive electrode active material layer 223, a ratio (A/B) of an area A occupied by the hollow portion 614 of the positive electrode active material particles 610 among the sectional SEM image and a sectional area B apparently occupied by the positive electrode active material particles 610 is obtained. Here, the sectional area B apparently occupied by the positive electrode active material particles 610 is a sectional area occupied by the shell portion 612, the hollow portion 614, and the through hole 616 of the positive electrode active material particles 610.

Furthermore, an average value of the ratio (A/B) described above is obtained from a plurality of arbitrary sectional SEM images of the positive electrode active material layer 223. The larger the number of the sectional SEM images from which the ratio (A/B) of the area among a sectional SEM image is obtained, the stronger the convergence of the average value of the ratio (A/B) with respect to the positive electrode active material layer 223. Based on the average value of this ratio (A/B), a ratio of the hollow portion 614 among the apparent sectional area of the positive electrode active material particles 610 in the positive electrode active material layer 223 on average can be approximately obtained. The ratio of the hollow portion 614 among the apparent sectional area of the positive electrode active material particles 610 in the positive electrode active material layer 223 on average will be referred to as a "particle porosity" as appropriate.

<Thickness T of Shell Portion 612>

In this case, the shortest distance T(k) described above is obtained at a plurality of positions on the inner surface 612a of the shell portion 612. Subsequently, an average of the shortest distances T(k) obtained at a plurality of positions on the inner surface 612a of the shell portion 612 may be calculated. In this case, the larger the number of positions on the inner surface 612a of the shell portion 612 at which the shortest distance T(k) described above is obtained, the stronger the convergence of the thickness T of the shell portion 612 to an average value, which enables the thickness of the shell portion 612 to be reflected. If the shell portion 612 has a distorted sectional shape, it is difficult to unambiguously define a thickness. With this method, since the thickness of the shell portion 612 is unambiguously determined at an arbitrary position k on the inner surface 612a of the shell portion 612, the thickness T of the shell portion 612 over the entire positive electrode active material particles 610 can be approximately unambiguously defined.

As shown in FIG. 9, these positive electrode active material particles 610 have the shell portion 612, the hollow portion 614, and the through hole 616, and an inside of the shell portion 612 (the hollow portion 614) and the outside of the shell portion 612 communicate with each other through the through hole 616. These positive electrode active material particles 610 will be referred to as a holed hollow structure as appropriate. The hollow portion 614 of these positive electrode active material particles 610 is spacious and, for example, the ratio of the hollow portion 614 among the apparent sectional area of the positive electrode active material particles 610 may be 23% or higher. In addition, these positive electrode active material particles 610 have the through hole 616 that penetrates the shell portion 612. Therefore, the electrolyte solution 280 (refer to FIGS. 7 and 8) also penetrates to the inside of shell portion 612 (the hollow portion 614) via the through hole 616. In the positive electrode active material particles 610, the hollow portion 614 is spacious. Therefore, the electrolyte solution 280 containing lithium ions sufficiently exists not only outside the shell portion 612 but also inside the shell portion 612 (the hollow portion 614). Furthermore, in the lithium-ion secondary battery 100, the shell portion 612 of the positive electrode active material particles 610 on an arbitrary cross section of the positive electrode active material layer 223 on average is thin and has a thickness T of 2.2 μm or less.

According to findings made by the present inventors, the thinner the thickness T of the shell portion 612 of the positive electrode active material particles 610, the more readily the lithium ions are released from the inside of the shell portion 612 of the positive electrode active material particles 610 during charging and the more readily the lithium ions are absorbed even to the inside of the shell portion 612 of the positive electrode active material particles 610 during discharging.

In this lithium-ion secondary battery 100, in the positive electrode active material layer 223 on average, the ratio of the hollow portion 614 among the apparent sectional area of the positive electrode active material particles 610 is 23% or higher, the positive electrode active material particles 610 have a through hole 616 penetrating the shell portion 612, and the thickness T of the shell portion 612 of the positive electrode active material particles 610 is extremely thin (in this case, 2.2 μm or less). Therefore, lithium ions diffuse rapidly into the shell portion 612 (inside of the active material) of the positive electrode active material particles 610. In other words, lithium ions are readily released even from the inside of the shell portion 612 of the positive electrode active material particles 610 during charging, and the lithium ions are readily absorbed even to the inside of the shell portion 612 of the positive electrode active material particles 610 during discharging.

As shown, during charging and discharging of the lithium-ion secondary battery 100, the positive electrode active material particles 610 contribute toward smooth release and absorption of the lithium ions even to the inside of the shell portion 612. Consequently, amounts of release and absorption of the lithium ions per unit weight of the positive electrode active material particles 610 can be increased, and a resistance during the release and absorption of the lithium ions by the positive electrode active material particles 610 can be reduced. Therefore, output of the lithium-ion secondary battery 100 is less likely to decrease ever when the amount of charge is low. In other words, with the lithium-ion secondary battery 100, lithium ions are readily released even from the inside of the shell portion 612 of the positive electrode active material particles 610, and the lithium ions are readily absorbed even to the inside of the shell portion 612, of the positive electrode active material particles 610. Therefore, the lithium-ion secondary battery 100 is capable of producing a required output even if the amount of charge is low.

As described above, the positive electrode active material particles 610 have the shell portion 612, the hollow portion 614, and the through hole 616. In addition, the hollow portion 614 is spacious and the shell portion 612 is thin. Previously, such positive electrode active material particles 610 are generally unknown. For example, the ratio of the hollow portion 614 among an apparent sectional area of the positive electrode active material particles 610 is 23% or higher and, therefore, may be distinctly distinguished from a simple sintered body.

<Production Method of Positive Electrode Active Material Particles 610>

Hereinafter, a preferable production method of these positive electrode active material particles 610 which is capable of stably producing the positive electrode active material particles 610 will be described.

The production method of the positive electrode active material particles 610 comprises, for example, a raw material hydroxide formation step, a mixing step, and a calcining step. The raw material hydroxide formation step is a step of supplying ammonium ions to an aqueous solution of a transition metal compound and precipitating particles of the transition metal hydroxide from the aqueous solution. In this case, the aqueous solution contains at least one transition metal element that composes the lithium transition metal oxide.

The mixing step is a step of mixing the transition metal hydroxide with a lithium compound to prepare an unfired mixture. The calcining step is a step of calcining the mixture to obtain the positive electrode active material particles 610. Furthermore, preferably, the fired product may be crushed and sieved after the calcining.

In this case, the raw material hydroxide formation step may include a nucleation stage in which the transition metal hydroxide is precipitated from the aqueous solution and a particle growth stage in which the transition metal hydroxide is grown in a state where a pH of the aqueous solution is lowered from the nucleation stage.

Hereinafter, the production method of the positive electrode active material particles 610 will be exemplified more specifically.

The holed hollow active material particles disclosed herein can be produced by, for example, precipitating a hydroxide of a transition metal under suitable conditions from an aqueous solution containing at least one transition metal element contained in a lithium transition metal oxide that composes the active material particles (and favorably, all transition metals other than lithium contained in the oxide), and mixing the transition metal hydroxide with a lithium compound followed by calcining. Although the following provides a detailed explanation of an embodiment of this active material particle production method by using, as an example, a case of producing holed hollow active material particles composed of a LiNiCoMn oxide and having a layered structure, this explanation is not intended to limit the application target of this production method to holed hollow active material particles composed in this manner.

The active material particle production method disclosed herein includes a step of supplying ammonium ions ($NH_4^+$) to an aqueous solution of a transition metal compound and precipitating particles of transition metal hydroxide from the aqueous solution (raw material hydroxide formation step). The solvent (aqueous solvent) that composes the aqueous solution is typically water, and may also be a mixed solvent composed mainly of water. An organic solvent able to uniformly mix with water (such as a lower alcohol) is preferable as a solvent other than water that composes the mixed solvent. The aqueous solution of the transition metal compound (to also be referred to hereinafter as a "transition metal solution") contains at least one (favorably all) transition metal element(s) (here, Ni, Co and Mn) that composes the lithium transition metal oxide corresponding to the composition of the lithium transition metal oxide that composes the active material particles targeted for production. For example, a transition metal solution is used that contains one type or two or more types of compounds that are capable of supplying Ni ions, Co ions and Mn ions to the aqueous solvent. Examples of compounds serving as the source of these metal ions that can be used preferably include sulfates, nitrates and chlorides of the metals. For example, a transition metal solution can be used favorably that has a composition in which nickel sulfate, cobalt sulfate and manganese sulfate are dissolved in an aqueous solvent (favorably water).

The above-mentioned $NH_4^+$ ions may be supplied to the transition metal solution in the form of an aqueous solution containing $NH_4^+$ ions (typically a water-based solution), may be supplied to the transition metal solution by directly blowing in ammonia gas, or may be supplied by a combination thereof. An aqueous solution containing $NH_4^+$ ions can be prepared by, for example, dissolving a compound capable of serving as an $NH_4^+$ ion source (such as ammonium hydroxide, ammonium nitrate or ammonia gas) in an aqueous solvent. In the present embodiment, $NH_4^+$ ions are supplied in the form of an aqueous ammonium hydroxide solution (namely, ammonia water).

The above-mentioned raw material hydroxide formation step can include a stage in which a transition metal hydroxide is precipitated from the transition metal solution under conditions of a pH of 12 or higher (and typically, pH 12 to pH 14, and for example, pH 12.2 to pH 13) and at an $NH_4^+$ concentration of 25 g/L or lower (and typically, 3 to 25 g/L) (nucleation stage). The pH and the $NH_4^+$ concentration can be adjusted by suitably balancing the amounts of the ammonia water and an alkaline agent (a compound having an action that causes a liquid to become alkaline) used. Sodium hydroxide or potassium hydroxide, for example, can be used for the alkaline agent, typically in the form of an aqueous solution. In the present embodiment, an aqueous sodium hydroxide solution is used. In the present specification, pH values refer to pH values based on a liquid temperature of 25° C.

The above-mentioned raw material hydroxide formation step can further include a stage in which cores (typically, particulate) of the transition metal hydroxide precipitated in the above-mentioned nucleation stage are grown at a pH lower than 12 (typically, pH 10 or higher and lower than pH 12, favorably pH 10 to pH 11.8, and for example, pH 11 to pH 11.8) and an $NH_4^+$ concentration of 1 g/L or higher, and favorably 3 g/L or higher (typically, 3 to 25 g/L) (particle growth stage). Normally, the pH of the particle growth stage is 0.1 or higher (typically 0.3 or higher, favorably 0.5 or higher, and for example, about 0.5 to 1.5) lower than the pH of the nucleation stage.

The pH and the $NH_4^+$ concentration can be adjusted in the same manner as in the nucleation stage. By carrying out this particle growth stage so as to satisfy the above-mentioned pH and $NH_4^+$ concentration, and making the $NH_4^+$ concentration at the above-mentioned pH to favorably be within the range of 15 g/L or lower (for example, 1 to 15 g/L and typically 3 to 15 g/L) and more favorably within the range of 10 g/L or lower (for example, 1 to 10 g/L, and typically 3 to 10 g/L), the precipitation rate of the transition metal hydroxide (here, a complex hydroxide containing Ni, Co and Mn) increases, and raw material hydroxide particles can be formed that are suitable for forming the holed hollow active material particles disclosed herein (or in other words, raw material hydroxide particles that easily form a fired product having a holed hollow structure).

The above-mentioned $NH_4^+$ concentration may also be made to be 7 g/L or lower (for example, 1 to 7 g/L and more favorably 3 to 7 g/L). The $NH_4^+$ concentration in the particle growth stage may be, for example, roughly equal to the $NH_4^+$ concentration in the nucleation stage or may be lower than the $NH_4^+$ concentration in the nucleation stage. The precipitation rate of the transition metal hydroxide can be determined by, for example, investigating the change in the total number of moles of transition metal ions contained in the liquid phase of the reaction solution (total ion concentration) relative to the total number of moles of transition metal ions contained in the transition metal solution supplied to the reaction solution.

The temperature of the reaction solution in each of the nucleation stage and particle growth stage is favorably controlled to a nearly constant temperature (for example, a prescribed temperature ±1° C.) within a range of roughly 30°

C. to 60° C. The temperatures of the reaction solutions in the nucleation stage and the particle growth stage may be the same. In addition, the atmosphere in the reaction solutions and the reaction tanks is favorably maintained at a non-oxidizing atmosphere throughout the nucleation stage and the particle growth stage. In addition, the total number of moles of Ni ions, Co ions and Mn ions contained in the reaction solution (total ion concentration) is made to be, for example, roughly 0.5 to 2.5 mol/L, and favorably about 1.0 to 2.2 mol/L, throughout the nucleation stage and the particle growth stage. The transition metal solution may be replenished (typically, supplied continuously) according to the precipitation rate of the transition metal hydroxide so as to maintain this total ion concentration. The amounts of Ni ions, Co ions and Mn ions contained in the reaction solution are favorably set to a quantity ratio that corresponds to the composition of the target active material particles (namely, the molar ratio of Ni, Co and Mn in the LiNiCoMn oxide that composes the active material particles).

In the present embodiment, the transition metal hydroxide particles (here, complex hydroxide particles containing Ni, Co and Mn) formed in the manner described above are separated from the reaction solution, and washed and dried. An unfired mixture is then prepared by mixing the transition metal hydroxide particles and a lithium compound at a desired quantity ratio (mixing step). In this mixing step, the Li compound and the transition metal hydroxide particles are typically mixed at a quantity ratio corresponding to the composition of the target active material particles (namely, the molar ratio of Li, Ni, Co and Mn in the LiNiCoMn oxide that composes the active material particles). Examples of the lithium compound that can be used favorably include Li compounds such as lithium carbonate or lithium hydroxide that can become oxides as a result of melting with heat.

The above-mentioned mixture is then fired to obtain active material particles (calcining step). This calcining step is typically carried out in an oxidizing atmosphere (for example, in the air). The calcining temperature in this calcining step can be, for example, 700° C. to 1100° C. The calcining step is favorably carried out so that a maximum calcining temperature is 800° C. or higher (favorably 800° C. to 1100° C. and for example, 800° C. to 1050° C.). As a result of the maximum calcining temperature being within these ranges, a sintering reaction of primary particles of a lithium transition metal oxide (favorably an Ni-containing Li oxide and, here, an LiNiCoMn oxide) can be allowed to proceed suitably.

In a favorable aspect thereof, the calcining step is carried out in an aspect that includes a first calcining stage, in which the mixture is fired at a temperature T1 of 700° C. to 900° C. (namely, 700° C.≤T1≤900° C., for example, 700° C.≤T1≤800° C., and typically 700° C.≤T1<800° C.), and a second calcining stage, in which the result of the first calcining stage is fired at a temperature T2 of 800° C. to 1100° C. (namely, 800° C.≤T2≤1100° C., and for example, 800° C.≤T2≤1050° C.). As a result, active material particles having a holed hollow structure can be formed more efficiently. T1 and T2 are favorably set such that T1<T2.

The first calcining stage and the second calcining stage may be carried out continuously (by, for example, holding the mixture at the first calcining temperature T1 following raising the temperature of the mixture to the second calcining temperature T2 and holding at that calcining temperature T2), or after having held at the first calcining temperature T1, the mixture may be temporarily cooled (by, for example, cooling to room temperature) and then supplying the mixture to the second calcining stage after having crushed and sieved the mixture as necessary.

In the technology disclosed herein, the first calcining stage can be understood to be a stage during which calcining is carried out at the temperature T1 that is within a temperature range at which the sintering reaction of the target lithium transition metal oxide progresses, is equal to or lower than the melting point thereof, and is lower than that of the second calcining stage. In addition, the second calcining stage can be understood to be a stage at which calcining is carried out at a temperature T2 that is within a temperature range at which the sintering reaction of the target lithium transition metal oxide progresses, is equal to or lower than the melting point thereof, and is higher than that of the first calcining stage. A temperature difference of 50° C. or higher (typically 100° C. or higher, and for example, 150° C. or higher) is favorably provided between T1 and T2.

As described above, the production method of the positive electrode active material particles 610 comprises the raw material hydroxide formation step, the mixing step, and the calcining step. In this case, the positive electrode active material particles 610 may be stably obtained such that the ratio of the hollow portion 614 among the apparent sectional area of the positive electrode active material particles 610 is 23% or higher and the shell portion 612 of the positive electrode active material particles 610 is thin with a thickness T of 2.2 μm or less. Hereinafter, a production method of the positive electrode active material particles 610 which is capable of producing these positive electrode active material particles 610 in a more stable manner will be described.

<Raw Material Hydroxide Formation Step>

In order to obtain the positive electrode active material particles 610 more stably, for example, the pH or the NH4+ concentration of the stage in which a transition metal hydroxide is precipitated from a transition metal solution (nucleation stage) and the pH or the NH4+ concentration of the stage in which cores of the transition metal hydroxide precipitated in the nucleation stage are grown (particle growth stage) are appropriately adjusted.

In this transition metal solution, for example, equilibrium reactions such as those presented below are taking place.

$$(M1)^{2+} + (NH_3) \Leftrightarrow [M1(NH_3)_6]^{2+} \qquad \text{Formula 1, and}$$

$$(M1)^{2+} + 2OH^- \Leftrightarrow M1(OH)_2 \qquad \text{Formula 2,}$$

where, M1 represents transition metals contained in the transition metal solution and, in the present embodiment, includes Ni.

In other words, in the equilibrium reaction represented by Formula 1, a transition metal (M1) in the transition metal solution, ammonia ($NH_3$) supplied to the transition metal solution, and a compound ($[M1(NH_3)_6]^{2+}$) of the transition metal (M1) and the ammonia ($NH_3$) are in equilibrium. In the equilibrium reaction represented by Formula 2, the transition metal (M1) in the transition metal solution, hydroxide ions ($OH^-$) supplied to the transition metal solution, and a transition metal hydroxide ($M1(OH)_2$) are in equilibrium.

In this case, when the pH in the transition metal solution decreases, the transition metal hydroxide ($M1(OH)_2$) is more readily precipitated due to the equilibrium reaction represented by Formula 2. At this point, by keeping the amount of ammonia in the transition metal solution low so that the equilibrium equation represented by Formula 1 proceeds toward the left-hand side and the transition metal ions $(M1)^{2+}$ in the transition metal solution increases, the transition metal hydroxide $(M1(OH)_2)$ is more readily precipitated. In this manner, by keeping the amount of ammonia in the transition metal solution low and, at the same time, lowering the pH in the transition metal solution, the transition metal hydroxide $(M1(OH)_2)$ is more readily precipitated.

For example, in the nucleation stage, solubility of ammonia $(NH_3)$ in the transition metal solution is kept low while the pH is kept relatively high. Accordingly, a precipitation rate of the transition metal hydroxide $(M1(OH)_2)$ can be adequately suppressed. As a result, a density inside particles of the transition metal hydroxide which become a precursor can be lowered. Furthermore, in the particle growth stage, solubility of ammonia $(NH_3)$ in the transition metal solution is kept low while lowering the pH. Accordingly, the precipitation rate of the transition metal hydroxide $(M1(OH)_2)$ increases in the nucleation stage. As a result, the density in a vicinity of outer surfaces of the particles of the transition metal hydroxide which becomes a precursor becomes higher than the density inside the particles of the transition metal hydroxide.

As described above, by appropriately adjusting the pH and the ammonia concentration (ammonium ion concentration) of the transition metal solution in the nucleation stage and the particle growth stage, the density of the transition metal hydroxide inside the particles can be lowered and the density of the transition metal hydroxide in the vicinity of the outer surfaces can be increased.

In this case, for example, the pH of the transition metal solution in the nucleation stage may be 12 to 13, and the pH of the aqueous solution in the particle growth stage may be 11 or higher and lower than 12. At this point, favorably, the pH of the transition metal solution in the nucleation stage has been lowered from the particle growth stage by 0.1 or more and favorably by 0.2 or more. In addition, the ammonia concentration (ammonium ion concentration) in the particle growth stage may be kept low at 3 g/L to 10 g/L. Accordingly, the precipitation rate of the transition metal hydroxide $(M1(OH)_2)$ can reliably be set higher in the particle growth stage than in the nucleation stage. As a result, the density in a vicinity of outer surfaces of the particles of the transition metal hydroxide becomes reliably higher than the density inside the particles of the transition metal hydroxide.

Moreover, by securing a required amount of time for the nucleation stage, the hollow portion 614 of the positive electrode active material particles 610 can be enlarged. In addition, by increasing the precipitation rate of the transition metal hydroxide in the particle growth stage and reducing a duration of the particle growth stage, the shell portion 612 of the positive electrode active material particles 610 can be made thinner.

Furthermore, in this case, the amount of ammonia in the transition metal solution may be kept low. For example, an ammonium ion concentration in the transition metal solution in the nucleation stage may be 20 g/L or lower, and the ammonium ion concentration in the transition metal solution in the particle growth stage may be 10 g/L or lower. As described above, by keeping the ammonium ion concentration of the transition metal solution in the nucleation stage and the particle growth stage at a low level, the concentration of transition metal ions contained in the transition metal solution can be maintained at a required level. In this case, an excessively small amount of ammonia in the transition metal solution is also unfavorable. The ammonium ion concentration of the transition metal solution in the nucleation stage and the particle growth stage may be, for example, 3 g/L or higher.

<Mixing Step, Calcining Step>

In the mixing step, the transition metal hydroxide and a lithium compound are mixed to prepare an unfired mixture. In the calcining step, the mixture is calcined to obtain the positive electrode active material particles 610. In this case, with the particles of the transition metal hydroxide which is a precursor of the positive electrode active material particles 610, the density inside is low and the density in the vicinity of the outer surface is high. Therefore, in the calcining step, sintering is performed so that the interior with the lower density among the particles of the transition metal hydroxide that is a precursor is incorporated into the vicinity of the outer surface having a higher density and a high mechanical strength. As a result, the shell portion 612 as well as a spacious hollow portion 614 of the positive electrode active material particles 610 are formed. In addition, as crystals grow during sintering, the through hole 616 that penetrates the shell portion 612 is formed in a part of the shell portion 612. Accordingly, as shown in FIG. 9, the positive electrode active material particles 610 having the shell portion 612, the hollow portion 614, and the through hole 616 are formed. Furthermore, preferably, the fired product is crushed and sieved after the calcining step to adjust particle diameters of the positive electrode active material particles 610.

The positive electrode active material particles 610 produced as described above have a thin shell portion 612, a spacious hollow portion 614, and a through hole 616 which penetrates the shell portion 612 and which spaciously connects the hollow portion 614 and the outside of the shell portion 612 of the positive electrode active material particles 610 with each other. In a preferable mode of these positive electrode active material particles 610, a BET specific surface area of the positive electrode active material particles 610 can be set to approximately 0.3 $m^2/g$ to 2.2 $m^2/g$. The BET specific surface area of the positive electrode active material particles 610 may be more favorably set to approximately 0.5 $m^2/g$ or more and even more favorably set to approximately 0.8 $m^2/g$ or more. In addition, the BET specific surface area of the positive electrode active material particles 610 may be set to approximately 1.9 $m^2/g$ or less and more favorably set to approximately 1.5 $m^2/g$ or less.

Furthermore, with these positive electrode active material particles 610, as described above, the raw material hydroxide formation step is divided into the nucleation stage and the particle growth stage and the density of the shell portion 612 is high. Therefore, positive electrode active material particles 610 are obtained which are harder and have high morphological stability than those produced by other methods (for example, a spray firing method (also referred to as a spray drying method)).

For example, these positive electrode active material particles 610 have an average hardness of 0.5 MPa or more as obtained by measuring dynamic hardness under conditions of a loading speed of 0.5 mN/sec to 3 mN/sec using a flat diamond indenter having a diameter of 50 μm.

In addition, in another favorable aspect of the active material particles disclosed herein, the average hardness of the positive electrode active material particles 610 is approximately 0.5 MPa or more. Here, average hardness refers to a value obtained by measuring dynamic microhardness under conditions of a loading speed of 0.5 mN/sec to 3 mN/sec using a flat diamond indenter having a diameter of 50 μm. For example, a microhardness tester MCT-W500 manufactured by Shimadzu Corporation can be used for this dynamic microhardness measurement.

As described above, as shown in FIG. 9, the positive electrode active material particles 610 have a hollow structure and have a high average hardness (in other words, high shape retention). These positive electrode active material particles 610 may provide a battery that stably demonstrates higher performance. Therefore, the positive electrode active material particles 610 are extremely preferable for constructing a lithium secondary battery that has low internal resistance (or in other words, favorable output characteristics) and demonstrates little increase in internal resistance attributable to charge-discharge cycling (particularly, charge-discharge cycling that includes high-rate discharge).

<Lithium Transition Metal Oxide Constituting Positive Electrode Active Material Particles 610>

In the production of these positive electrode active material particles 610, particularly, the transition metal solution favorably contains nickel. When the transition metal solution contains nickel, as the transition metal hydroxide is precipitated in the nucleation stage and the particle growth stage, particles of the transition metal hydroxide are created in the form of secondary particles formed by an aggregation of a plurality of minute primary particles with shapes resembling rice grains. In addition, in the temperature range during calcining, crystals grow while more or less maintaining the shapes of the primary particles of this transition metal hydroxide.

On the other hand, in a case where the transition metal solution contains absolutely no nickel but contains cobalt instead and lithium cobaltate ($LiCoO_2$) particles are created by calcining, the shape of the primary particles cannot be maintained and entire particles end up being sintered. As a result, positive electrode active material particles 610 (refer to FIG. 9) having a spacious hollow portion 614 as described above may not be obtained.

As shown, in order to stably produce the positive electrode active material particles 610, the lithium transition metal oxide is preferably a compound which has a layered structure and which contains nickel as a constituent element. By containing nickel in this manner, transition metal hydroxide particles (precursor particles) with low internal density and high density in the vicinity of the outer surface can be formed. In addition, based on the precursor particles with low internal density and high density in the vicinity of the outer surface, crystals can be grown in the calcining step while more or less maintaining the shapes of the primary particles. Accordingly, the positive electrode active material particles 610 (refer to FIG. 9) having the shell portion 612, the hollow portion 614, and the through hole 610 are formed.

In this case, the ratio (composition ratio) of nickel among the transition metals contained in the positive electrode active material particles 610 may be approximately 0.1% or higher and, more favorably, 0.25% or higher.

In addition, the lithium transition metal oxide may be a compound which has a layered structure and which contains nickel, cobalt, and manganese as constituent elements. For example, the lithium transition metal oxide may be a compound which has a layered structure and which is expressed as $Li_{1+x}Ni_yCo_zMn_{(1-y-z)}M_y$, where $0 \le x \le 0.2$, $0.1 < y < 0.9$, $0.1 < z < 0.4$, M denotes an additive, and $0 \le y \le 0.01$. For example, M may be at least one additive selected from the group consisting of Zr, W, Mg, Ca, Na, Fe, Cr, Zn, Si, Sn, Al, B, and F. This lithium transition metal oxide constitutes a compound with a layered structure and is capable of retaining lithium ions between the layers. In addition, this lithium transition metal oxide is particularly preferable for producing the positive electrode active material particles 610 described above which has the shell portion 612, the hollow portion 614, and the through hole 616.

Accordingly, the positive electrode active material particles 610 can be obtained such that the ratio of the hollow portion 614 among the apparent sectional area of the positive electrode active material particles 610 is 23% or higher and the shell portion 612 of the positive electrode active material particles 610 is thin with a thickness T of 2.2 μm or less.

As described earlier, as shown in FIGS. 1 to 3, the lithium-ion secondary battery 100 comprises the positive electrode current collector 221 (current collector) and the porous positive electrode active material layer 223 retained by the positive electrode current collector 221. As shown in FIG. 4, this positive electrode active material layer 223 contains the positive electrode active material particles 610, the electrically conductive material 620, and the binder 630. In the present embodiment, as shown in FIG. 9, the positive electrode active material particles 610 have the shell portion 612 constituted by a lithium transition metal oxide, the hollow portion 614 formed inside the shell portion 612, and the through hole 616 penetrating the shell portion 612.

As shown in FIG. 1, in the lithium-ion secondary battery 100, in the positive electrode active material layer 223 on average, a ratio of the hollow portion 614 among an apparent sectional area of the positive electrode active material particles 610 (refer to FIG. 9) is 23% or higher. In addition, on an arbitrary cross section of the positive electrode active material layer 223, a thickness of the shell portion 612 at an arbitrary position on the inner surface 612a of the shell portion 612 is assumed to be a shortest distance T(k) from the arbitrary position k to an outer surface of the shell portion 612. In this case, the thickness of the shell portion 612 on an arbitrary cross section of the positive electrode active material layer 223 on average is 2.2 μm or less.

According to the lithium-ion secondary battery 100, as shown in FIG. 9, in the positive electrode active material layer 223 on average, a ratio of the hollow portion 614 among an apparent sectional area of the positive electrode active material particles 610 (refer to FIG. 9) is 23% or higher and the hollow portion 614 is spacious. In this lithium-ion secondary battery 100, the electrolyte solution 280 (refer to FIGS. 7 and 8) sufficiently penetrates to the hollow portion 614 of the positive electrode active material particles 610 in the positive electrode active material layer 223. Furthermore, in the lithium-ion secondary battery 100, the shell portion 612 on an arbitrary cross section of the positive electrode active material layer 223 on average has a thickness of 2.2 μm or less and the shell portion 612 of the positive electrode active material particles 610 is thin. Therefore, lithium ions diffuse rapidly to the inside of the shell portion 612 (inside of the active material) of the positive electrode active material particles 610. As a result, the lithium-ion secondary battery 100 can stably produce high output even when the amount of charge is low.

In this case, in the positive electrode active material layer 223 on average, the thickness of the shell portion 612 may be, for example, 0.05 μm or more and, more favorably, 0.1 μm or more. When the thickness of the shell portion 612 is 0.05 μm or more and, more favorably, 0.1 μm or more, the positive electrode active material particles 610 obtain necessary mechanical strength. As lithium ions are repetitively released and absorbed, expansion and contraction occur in the positive electrode active material particles 610. Strength can be secured which is even sufficient with respect to such expansion and contraction. Therefore, durability of the positive electrode active material particles 610 is improved and performance of the lithium-ion secondary battery 100 may remain stable over time.

Furthermore, in the positive electrode active material layer 223 on average, an opening width of the through hole 616 may be on average 0.01 µm or more. Here, the opening width of the through hole 616 refers to the length across a portion where the through hole 616 is narrowest among a path which reaches the hollow portion 614 from the outside of the positive electrode active material particles 610. When the opening width of the through hole 616 is on average 0.01 µm or more, the electrolyte solution 280 (refer to FIG. 7 or 8) can sufficiently penetrate into the hollow portion 614 through the through hole 616 from the outside. Accordingly, an effect of improving battery performance of the lithium-ion secondary battery 100 can be more appropriately demonstrated.

For example, normally, the thin shell portion 612, the spacious hollow portion 614, and the through hole 616 with the wide opening width such as observed in the positive electrode active material particles 610 cannot be realized by other production methods (for example, a spray firing method (also referred to as a spray drying method)).

An average value of the above-mentioned opening size (average opening size) can be obtained by, for example, ascertaining opening sizes of a portion of or all of the through holes 616 possessed by at least ten positive electrode active material particles 610, and then determining the arithmetic average thereof. In addition, the through hole 616 need only be suitable for the penetration of the electrolyte solution 280 to the hollow portion 614 and, in the positive electrode active material layer 223 on average, the opening width of the through hole 616 may be approximately 2.0 µm or less.

<Evaluation of Positive Electrode Active Material Particles 610>

Hereinafter, the present inventors fabricated evaluation batteries respectively using positive electrode active material particles 610 which differed from each other in terms of the ratio of the hollow portion 614 among an apparent sectional area, the thickness of the shell portion 612, and the presence or absence of the through hole 616 in order to compare battery performances.

<Evaluation Battery>

A structure of the evaluation battery will now be described. Moreover, since the evaluation battery is a so-called flat, square battery such as that shown in FIG. 1 and has a basic structure that is more or less the same as the lithium-ion secondary battery 100 described earlier, the description will refer to the lithium-ion secondary battery 100 as appropriate. In addition, members or portions that produce same effects will be denoted by same reference characters.

<Negative Electrode of Evaluation Battery 100>

As shown in FIGS. 1 and 5, the negative electrode of the evaluation battery 100 comprises a negative electrode current collector 241 and a negative electrode active material layer 243 retained by the negative electrode current collector 241. The negative electrode active material layer 243 comprises negative electrode active material 710 and a binder 730.

In the evaluation battery 100, a copper foil with a thickness of approximately 10 µm is used as the negative electrode current collector 241. This negative electrode current collector 241 is a band-like sheet member with a width of approximately 120 mm and a length of approximately 3200 mm, and an uncoated portion 242 in which the negative electrode active material layer 243 is not formed is set in a lengthwise direction along one width-direction edge of the negative electrode current collector 241. The negative electrode active material layer 243 is retained on both surfaces of the negative electrode current collector 241 in a portion (a portion with a width of approximately 105 mm) excluding the uncoated portion 242.

For the negative electrode active material 710 (refer to FIG. 5) contained in the negative electrode active material layer 243, 96% by weight of natural graphite powder was mixed and impregnated with 4% by weight of pitch. The mixture was then calcined for 10 hours at 1000° C. to 1300° C. under an inert atmosphere. The obtained negative electrode active material 710 was sieved so as to adjust an average particle diameter (median diameter D50) to approximately 8 to 11 µm and a specific surface area to within a range of approximately 3.5 to 5.5 m$^2$/g.

The negative electrode active material layer 243 further contains a thickener. The thickener is a material for adjusting viscosity of a mixture prepared when forming the negative electrode active material layer 243. Here, carboxymethylcellulose (CMC) is used as this thickener. In addition, styrene-butadiene rubber (SBR) is used as the binder 730.

In this case, the negative electrode active material 710, the thickener, and the binder 730 are kneaded at a weight ratio of approximately 98.6:0.7:0.7 together with water to prepare a paste-like negative electrode mixture (negative electrode paste). Subsequently, the negative electrode mixture is coated on both surfaces of the negative electrode current collector 241 with the exception of the uncoated portion 242 so that an amount of coating on each surface after drying is approximately 7.5 mg/cm$^2$, and drying is performed to form the negative electrode active material layer 243. This negative electrode active material layer 243 was further rolled by a roll pressing machine to obtain a density of approximately 1.0 to 1.4 g/cc. Accordingly, the negative electrode sheet 240 (refer to FIG. 2) is obtained.

<Positive Electrode of Evaluation Battery 100>

As shown in FIGS. 1 and 6, the positive electrode of the evaluation battery 100 comprises a positive electrode current collector 221 and a positive electrode active material layer 223 retained by the positive electrode current collector 221. The positive electrode active material layer 223 comprises positive electrode active material particles 610, an electrically conductive material 620, and a binder 630 (refer to FIG. 6).

In the evaluation battery 100, an aluminum foil with a thickness of approximately 15 µm is used as the positive electrode current collector 221. This positive electrode current collector 221 is a band-like sheet member with a width of approximately 115 mm and a length of approximately 3000 mm, and an uncoated portion 222 in which the positive electrode active material layer 223 is not formed is set in a lengthwise direction along one width-direction edge of the positive electrode current collector 221. The positive electrode active material layer 223 is retained on both surfaces of the positive electrode current collector 221 in a portion (a portion with a width of approximately 95 mm) excluding the uncoated portion 222.

<Positive Electrode Active Material Particles 610 of Evaluation Battery 100>

For the positive electrode active material particles 610 (refer to FIG. 4) contained in the positive electrode active material layer 223, a mixed solution of nickel sulfate (NiSO$_4$), cobalt sulfate (CoSO$_4$), and manganese sulfate (MnSO$_4$) is neutralized by sodium hydroxide (NaOH). Subsequently, a transition metal hydroxide that becomes a precursor is obtained in a process of supplying ammonium ions (NH4+) to this transition metal compound aqueous solution and precipitating transition metal hydroxide particles from the aqueous solution (raw material hydroxide formation step). To this end, in the evaluation battery, Ni, Co, and Mn are contained at approximately a predetermined ratio in the transition metal hydroxide that becomes a precursor.

With the evaluation battery 100, in the mixing step described earlier, lithium carbonate ($Li_2CO_3$) is mixed into this transition metal hydroxide that becomes a precursor. This mixture is then calcined for 10 hours at 950° C. in the calcining step. Accordingly, positive electrode active material particles 610 with a basic composition of $Li_{1.15}Ni_{0.33}Co_{0.33}Mn_{0.33}O_2$ was fabricated. As shown in FIG. 9, the positive electrode active material particles 610 having the shell portion 612, the hollow portion 614, and the through hole 616 are formed. Furthermore, preferably, the fired product is crushed and sieved after the calcining step to adjust particle diameters of the positive electrode active material particles 610.

Here, the raw material hydroxide formation step was adjusted to prepare positive electrode active material particles 610 which differed from each other in terms of the ratio of the hollow portion 614 among an apparent sectional area, the thickness of the shell portion 612, and the presence or absence of the through hole 616. Moreover, in order to comparatively evaluate how much the performance of the evaluation battery 100 varies when the ratio of the hollow portion 614 among an apparent sectional area, the thickness of the shell portion 612, and the presence or absence of the through hole 616 differ, the composition of the positive electrode active material particles 610 among respective samples was set approximately the same. Meanwhile, there is a certain amount of variation in the average particle diameter (D50) of the positive electrode active material particles 610.

The positive electrode active material layer 223 contains the positive electrode active material particles 610, the electrically conductive material 620, and the binder 630. In the evaluation battery 100, acetylene black (AB) is used as the electrically conductive material 620 and polyvinylidene fluoride (PVDF) is used as the binder 630 of the positive electrode active material layer 223. The positive electrode active material particles 610, the electrically conductive material 620, and the binder 630 are kneaded at a weight ratio of 90:8:2 together with N-methyl-2-pyrrolidone (NMP) to prepare a paste-like positive electrode mixture (positive electrode paste).

Subsequently, the positive electrode mixture is coated on both surfaces of the positive electrode current collector 221 with the exception of the uncoated portion 222 so that an amount of coating on each surface after drying is approximately 11.8 mg/cm², and drying is performed to form the positive electrode active material layer 223. This positive electrode active material layer 223 was further rolled by a roll pressing machine to obtain a density of approximately 2.3 g/cm³. Accordingly, the positive electrode sheet 220 (refer to FIG. 2) is obtained.

<Electrolyte Solution of Evaluation Battery>

Next, an electrolyte solution of the evaluation battery 100 will be described. For the evaluation battery, the electrolyte solution may be obtained by mixing ethylene carbonate (EC), ethyl methyl carbonate (EMC), and dimethyl carbonate (DMC) at a ratio (molar ratio) of 3:3:4 and then dissolving $LiPF_6$ in the mixture to a concentration of 1.1 mol/L. In addition, an electrolyte solution can also be used into which difluorophosphate ($LiPO_2F_2$) and lithium bis(oxalato) borate (LiBOB) are dissolved either singularly or as a compound at a ratio of approximately 0.05 mol/L.

<Fabrication of Evaluation Battery>

Next, more or less as shown in FIGS. 1 and 2, the evaluation battery 100 is wound by overlapping the positive electrode sheet 220 and the negative electrode sheet 240 fabricated as described above on top of each other and interposing the separators 262 and 264 between the positive electrode sheet 220 and the negative electrode sheet 240. Subsequently, the wound electrode body 200 is fabricated by flatly deforming the wound electrode body 200 in one direction that is perpendicular to the winding axis WL (refer to FIG. 2). In the wound electrode body 200, the uncoated portion 222 of the positive electrode sheet 220 and the uncoated portion 242 of the negative electrode sheet 240 are exposed on both sides of the separators 262 and 264.

In the evaluation battery 100, an opposite capacity ratio calculated based on a charging capacity of the positive electrode and a charging capacity of the negative electrode is adjusted to 1.5 to 1.9.

More or less as shown in FIG. 1, a battery case 300 of the evaluation battery is a so-called square battery case and comprises a container main body 320 and a lid 340. The battery case 300 comprises the bottomed and square tube-shape container main body 320 having a flat rectangular inner space as a space for housing the wound electrode body 200, and the lid 340 that blocks the opening of the container main body 320. Electrode terminals 420 and 440 are attached to the lid 340 of the battery case 300. The uncoated portion 222 of the positive electrode sheet 220 of the wound electrode body 200 is connected to the electrode terminal 420. The uncoated portion 242 of the negative electrode sheet 240 of the wound electrode body 200 is connected to the electrode terminal 440.

For this evaluation battery, the wound electrode body 200 attached to the electrode terminals 420 and 440 of the lid 340 in this manner is housed in the container main body 320. Subsequently, a joint 322 of the lid 340 and the container main body 320 of the battery case 300 is welded by laser welding, an electrolyte solution is injected from an inlet 350 provided on the lid 340, and the inlet 350 is stopped.

<Conditioning>

Next, a conditioning process, a measurement of rated capacity, and SOC adjustment for the evaluation batteries 100 constructed as described above will be described in order.

In this case, the conditioning process is performed according to procedures 1 and 2 below.

Procedure 1: After reaching 4.1 V by charging at a constant current of 1 C, pause for 5 minutes.

Procedure 2: After Procedure 1, charge at a constant voltage for 1.5 hours and subsequently pause for 5 minutes.

<Measurement of Rated Capacity>

Next, rated capacity of the evaluation test batteries is measured according to procedures 1 to 3 below after the conditioning process described above at a temperature of 25° C. and within a voltage range of 3.0 V to 4.1 V.

Procedure 1: After reaching 3.0 V by discharging at a constant current of 1 C, discharge at a constant voltage for 2 hours and subsequently pause for 10 seconds.

Procedure 2: After reaching 4.1 V by charging at a constant current of 1 C, charge at a constant voltage for 2.5 hours and subsequently pause for 10 seconds.

Procedure 3: After reaching 3.0 V by discharging at a constant current of 0.5 C, discharge at a constant voltage for 2 hours and subsequently pause for 10 seconds.

Rated capacity: A discharge capacity (CCCV discharge capacity) of discharging from the constant current discharge to the constant voltage discharge in Procedure 3 is adopted as the rated capacity. In this evaluation batteries 100, the rated capacity reaches approximately 4 Ah.

Reference Signs List

<SOC Adjustment>

SOC adjustment is performed according to Procedures 1 and 2 below. In this case, SOC adjustment may be performed after the conditioning process and the rated capacity measurement described above. In addition, in this case, SOC adjustment is performed under a temperature environment of 25° C. in order to even out the effect of temperature.

Procedure 1: Charge at a constant current of 1 C from 3V to reach a charged state equivalent to approximately 60% of the rated capacity (SOC 60%). Here, "SOC" refers to State of Charge.

Procedure 2: After Procedure 1, charge at a constant voltage for 2.5 hours.

Accordingly, the evaluation battery 100 can be adjusted to a predetermined charged state.

A plurality of samples of the evaluation battery 100 which substantially only differed from each other in the positive electrode active material particles 610 were prepared to comparatively evaluate the performance of the evaluation battery 100. In addition, in order to evaluate output characteristics at a low temperature and a low charged state, "output characteristics at −30° C. and a charged state of SOC 25%" and "output characteristics at 0° C. and a charged state of SOC 25%" were evaluated as characteristics of the evaluation battery 100.

<Output Characteristics at −30° C. and Charged State of SOC 25%>

Output characteristics at −30° C. and a charged state of SOC 25% (hereinafter referred to as "output characteristics 1" as appropriate) are obtained according to the following procedures.

Procedure 1 [SOC adjustment]: As SOC adjustment, charge at a constant current of 1 C in a normal (in this case, 25° C.) temperature environment in order to adjust to SOC 25%. Next, charge at a constant voltage for 1 hour.

Procedure 2 [standing at −30° C. for 6 hours]: After Procedure 1 above, let the battery adjusted to SOC 25% stand in a −30° C. constant-temperature bath for 6 hours.

Procedure 3 [constant wattage discharge]: After Procedure 2 above, discharge at a constant wattage (W) from SOC 25% in a temperature environment of −30° C. When doing so, measure the number of seconds from the start of discharge until voltage reaches 2.0 V.

Procedure 4 [repetition]: Repeat Procedures 1 to 3 above while varying the condition of the constant wattage discharge voltage in Procedure 3 from 80 W to 200 W. In this case, Procedures 1 to 3 are repeated while increasing the constant wattage discharge voltage in Procedure 3 in 10 W increments such that a first repetition is performed at 80 W, a second repetition is performed at 90 W, a third repetition is performed at 100 W, and so forth until the constant wattage discharge voltage in Procedure 3 reaches 200 W. Here, the constant wattage discharge voltage in Procedure 3 is increased in 10 W increments. However, the constant wattage discharge voltage in Procedure 3 is not limited to the above, and the constant wattage discharge voltage may be increased in increments of a certain number of watts (for example, in 5 W increments or in 15 W increments) or may be reduced from 500 W in decrements of a certain number of watts (for example, in 5 W decrements, 10 W decrements, or 15 W decrements).

Figure 10:
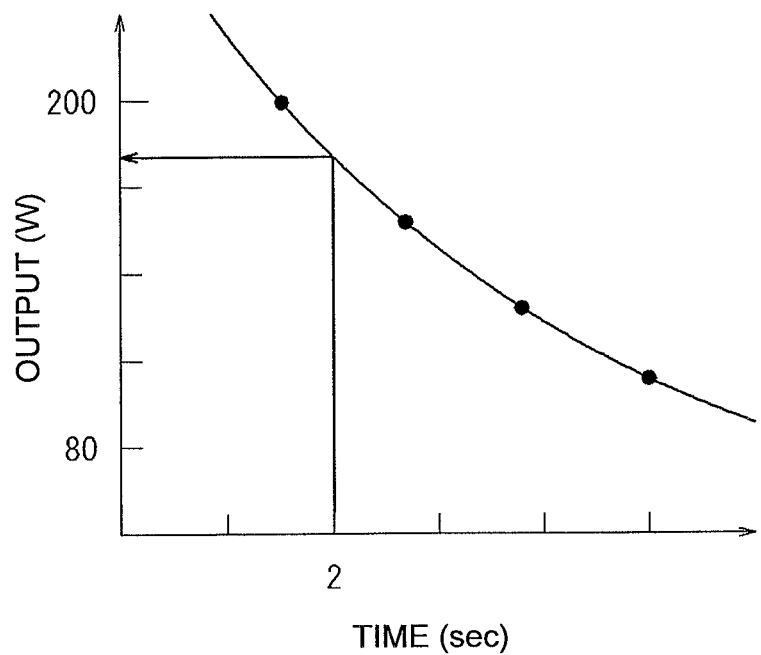
FIG. 10 is a graph exemplifying an approximate curve when calculating output characteristics 1.

Procedure 5 [calculation of output characteristics 1]: For example, as shown in FIG. 10, plot the number of seconds until 2.0 V as measured under the constant wattage condition in Procedure 4 above on the abscissa and W at that point on the ordinate, and calculate W at 2 seconds from an approximate curve of plots as the output characteristics 1.

The output characteristics 1 represent an output that can be produced by the evaluation battery 100 even in a case where the evaluation battery 100 stands in an extremely low temperature environment of −30° C. for a predetermined period of time at a low amount of charge of around SOC 25%. Therefore, the output characteristics 1 indicate that the higher the value of W, the higher the output that can be produced by the evaluation battery 100. The output characteristics 1 also indicate that the higher the value of W, the more stable the output that may be obtained even at a low amount of charge such as around SOC 25%.

<Output Characteristics at 0° C. and Charged State of SOC 25%>

Output characteristics at 0° C. and a charged state of SOC 25% (hereinafter referred to as "output characteristics 2" as appropriate) are obtained according to the following procedures.

Procedure 1 [SOC adjustment]: As SOC adjustment, charge at a constant current of 1 C in a normal (in this case, 25° C.) temperature environment in order to adjust to SOC 25%. Next, charge at a constant voltage for 1 hour.

Procedure 2 [standing at 0° C. for 6 hours]: After Procedure 1 above, let the battery adjusted to SOC 25% stand in a 0° C. constant-temperature bath for 6 hours.

Procedure 3 [constant wattage discharge]: After Procedure 2 above, discharge at a constant wattage (W) from SOC 25% in a temperature environment of 0° C. When doing so, measure the number of seconds from the start of discharge until voltage reaches 2.0 V.

Procedure 4 [repetition]: Repeat Procedures 1 to 3 above while varying the condition of the constant wattage discharge voltage in Procedure 3 from 350 W to 500 W. In this case, Procedures 1 to 3 are repeated while increasing the constant wattage discharge voltage in Procedure 3 in 10 W increments such that a first repetition is performed at 350 W, a second repetition is performed at 360 W, a third repetition is performed at 370 W, and so forth until the constant wattage discharge voltage in Procedure 3 reaches 500 W. Here, the constant wattage discharge voltage in Procedure 3 is increased in 10 W increments. However, the constant wattage discharge voltage in Procedure 3 is not limited to the above, and the constant wattage discharge voltage may be increased in increments of a certain number of watts (for example, in 5 W increments or in 15 W increments) or may be reduced from 500 W in decrements of a certain number of watts (for example, in 5 W decrements, 10 W decrements, or 15 W decrements).

Figure 11:
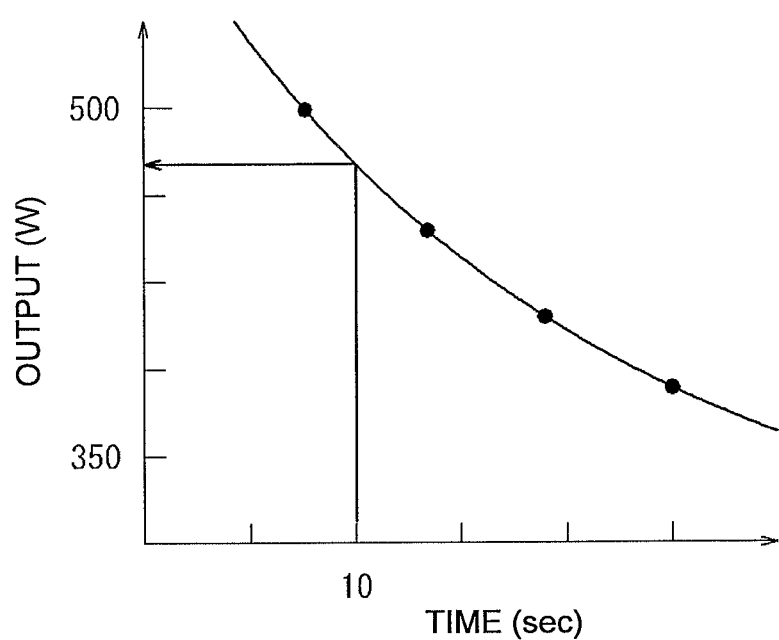
FIG. 11 is a graph exemplifying an approximate curve when calculating output characteristics 2.

Procedure 5 [calculation of output characteristics 2]: For example, as shown in FIG. 11, plot the number of seconds until 2.0 V as measured under the constant wattage condition in Procedure 4 above on the abscissa and W at that point on the ordinate, and calculate W at 10 seconds from an approximate curve of plots as the output characteristics 2.

The output characteristics 2 represents an output that can be produced by the evaluation battery 100 in a case where the evaluation battery 100 stands in a low temperature environment of 0° C. for a predetermined period of time at a low amount of charge of around SOC 25%. The output characteristics 2 indicate that the higher the value of W, the higher the output that can be produced by the evaluation battery 100. The output characteristics 2 also indicate that the higher the value of W, the more stable the output that may be obtained even at a low amount of charge of around SOC 25%.

Table 1 exemplifies, for a plurality of samples of the evaluation battery 100 which substantially only differ from each other in the positive electrode active material particles 610, a particle porosity of the positive electrode active material particles 610, a thickness of the shell portion 612, an average particle diameter (D50) of the positive electrode active material particles 610, output characteristics 1 of the evaluation battery 100, and output characteristics 2 of the evaluation battery 100.

hollow portion 614 among an apparent sectional area of the positive electrode active material particles 610 is 23% or higher. In addition, the thickness of the shell portion 612 in the positive electrode active material layer 223 on average is 2.2 μm or less.

In this case, on an arbitrary cross section of the positive electrode active material layer 223, a thickness T(k) of the shell portion 612 at an arbitrary position k on an inner surface of the shell portion 612 is defined as a shortest distance from the arbitrary position on the inner surface of the shell portion 612 to an outer surface of the shell portion 612. The thickness of the shell portion 612 of the positive

TABLE 1

|  | Particle porosity % | Thickness of shell portion μm | Average particle diameter of positive electrode active material particles (D50) μm | Presence/ absence of through hole — | −30° C., SOC 25%@2 s Output characteristics 1 W | 0° C., SOC 25%@10 s Output characteristics 2 W |
|---|---|---|---|---|---|---|
| Sample 1 | 23.8 | 2.15 | 7.4 | present | 128 | 478 |
| Sample 2 | 34.4 | 1.63 | 8.1 | present | 132 | 479 |
| Sample 3 | 45.2 | 1.31 | 7.6 | present | 135 | 481 |
| Sample 4 | 31.5 | 1.12 | 5.2 | present | 142 | 483 |
| Sample 5 | 27.6 | 0.98 | 4.1 | present | 143 | 484 |
| Sample 6 | 59.8 | 0.89 | 7.6 | present | 147 | 486 |
| Sample 7 | 48.7 | 0.72 | 5.4 | present | 151 | 488 |
| Sample 8 | 69.9 | 0.64 | 8.0 | present | 152 | 489 |
| Sample 9 | 77.4 | 0.36 | 6.1 | present | 155 | 491 |
| Sample 10 | 80.9 | 0.23 | 3.8 | present | 158 | 493 |
| Sample 11 | 90.2 | 0.13 | 5.3 | present | 161 | 494 |
| Sample 12 | 1.5 | 3.44 | 7.9 | absent | 79 | 411 |
| Sample 13 | 2.8 | 2.56 | 6.2 | absent | 83 | 416 |
| Sample 14 | 19.3 | 1.69 | 6.1 | absent | 86 | 418 |
| Sample 15 | 16.1 | 0.91 | 3.5 | absent | 90 | 425 |
| Sample 16 | 25.8 | 2.94 | 11.6 | present | 93 | 427 |

As shown in Table 1, there is a tendency that the higher the particle porosity of the positive electrode active material particles 610, the higher the values of the output characteristics 1 and the output characteristics 2. In addition, there is a tendency that the thinner the thickness of the shell portion 612 of the positive electrode active material particles 610, the higher the values of the output characteristics 1 and the output characteristics 2. Furthermore, between a case where the through hole 616 is present in the positive electrode active material particles 610 and a case where the through hole 616 is absent therefrom, the values of the output characteristics 1 and the output characteristics 2 tend to be higher when the through hole 616 is present. The presence or absence of the through hole 616 may be confirmed based on a sectional SEM image of the positive electrode active material particles 610 or a sectional SEM image of the positive electrode active material layer 223.

As described earlier, as shown in, for example, FIG. 1, the lithium-ion secondary battery 100 comprises the positive electrode current collector 221 and the porous positive electrode active material layer 223 retained by the positive electrode current collector 221. In this case, as shown in FIG. 4, the positive electrode active material layer 223 contains the positive electrode active material particles 610, the electrically conductive material 620, and the binder 630.

In this lithium-ion secondary battery 100, as shown in, for example, FIG. 9, the positive electrode active material particles 610 may have the shell portion 612 constituted by a lithium transition metal oxide, the hollow portion 614 formed inside the shell portion 612, and the through hole 616 penetrating the shell portion 612.

In the lithium-ion secondary battery 100, in the positive electrode active material layer 223 on average, a ratio of the hollow portion 614 among an apparent sectional area of the positive electrode active material particles 610 is 23% or higher. In addition, the thickness of the shell portion 612 in the positive electrode active material layer 223 on average is 2.2 μm or less.

electrode active material particles 610 in the positive electrode active material layer 223 on average may be obtained by, for example, obtaining a thickness of the shell portion 612 of the positive electrode active material particles 610 on a plurality of arbitrary cross sections of the positive electrode active material layer 223 and then determining an arithmetic average of the thickness of the shell portion 612 of the positive electrode active material particles 610.

In this case, the arithmetic average converges by increasing the number of cross sections of the positive electrode active material layer 223 on which the thickness of the shell portion 612 of the positive electrode active material particles 610 is calculated or by increasing the number of arbitrary positions k on the inner surface of the shell portion 612 at which the thickness T(k) of the shell portion 612 is obtained. The thickness of the shell portion 612 being 2.2 μm or less in the positive electrode active material layer 223 on average means that the arithmetic average is 2.2 μm or less.

In the lithium-ion secondary battery 100, in the positive electrode active material layer 223 on average, a ratio of the hollow portion 614 among an apparent sectional area of the positive electrode active material particles 610 is 23% or higher. In addition, the thickness of the shell portion 612 in the positive electrode active material layer 223 on average is 2.2 μm or less. According to this lithium-ion secondary battery, in the positive electrode active material layer 223 on average, the ratio of the hollow portion 614 among the apparent sectional area of the positive electrode active material particles 610 is 23% or higher, the positive electrode active material particles 610 have a through hole 616 penetrating the shell portion 612, and the thickness of the shell portion 612 of the positive electrode active material particles 610 is extremely thin (in this case, 2.2 μm or less).

Therefore, lithium ions diffuse rapidly into the shell portion (inside of the active material). As a result, the lithium-ion secondary battery can stably produce high output even when the amount of charge is low.

In this lithium-ion secondary battery 100, there is a tendency that the higher the particle porosity of the positive electrode active material particles 610, the greater the improvement in output characteristics. The particle porosity of the positive electrode active material particles 610 is favorably 30 or higher, more favorably 45 or higher, and even more favorably 60 or higher. Furthermore, in this lithium-ion secondary battery 100, there is a tendency that the thinner the shell portion 612 of the positive electrode active material particles 610, the greater the improvement in output characteristics. The thickness of the shell portion 612 of the positive electrode active material particles 610 is more favorably 1.5 μm or less, even more favorably 1.00 μm or less, further more favorably 0.8 μm or less, and even further more favorably 0.4 μm or less. Moreover, in order to secure durability of the positive electrode active material particles 610 with respect to usage, the thickness of the shell portion 612 may be, for example, 0.05 μm or more and, more favorably, 0.1 μm or more.

Moreover, the lithium transition metal oxide constituting the shell portion 612 of the positive electrode active material particles 610 may be a compound which has a layered structure and which contains nickel as a constituent element. This lithium transition metal oxide may be, for example, a compound which has a layered structure and which contains nickel, cobalt, and manganese as constituent elements. Alternatively, the lithium transition metal oxide may be a compound which has a layered structure and which is expressed as $Li_{1+x}Ni_yCo_zMn_{(1-y-z)}M_yO_2$, where $0 \leq x \leq 0.2$, $0.1 < y < 0.9$, $0.1 < z < 0.4$, M denotes an additive, and $0 \leq \gamma \leq 0.01$. Furthermore, M as the additive may be at least one additive selected from the group consisting of Zr, W, Mg, Ca, Na, Fe, Cr, Zn, Si, Sn, Al, B, and F.

As described above, with this lithium-ion secondary battery 100, output characteristics under low temperature are improved. In addition, stable output is obtained even when the amount of charge is low. Therefore, for example, this lithium-ion secondary battery 100 is suitable as a high capacity-lithium-ion secondary battery with a rated capacity of 3 Ah or higher such as that used as a vehicle drive battery. Since this lithium-ion secondary battery 100 is capable of providing stable output even when the amount of charge is low, an SOC width during use increases. As a result, an amount of power that can be extracted from the lithium-ion secondary battery 100 increases. As a vehicle drive battery, this lithium-ion secondary battery 100 can extend mileage of the vehicle per charge.

Here, particularly favorably, the positive electrode active material particles 610 may be positive electrode active material particles produced by a production method comprising: a raw material hydroxide formation step of supplying ammonium ions to a transition metal solution (an aqueous solution of a transition metal compound), and precipitating particles of the transition metal hydroxide from the transition metal solution; a mixing step of mixing the transition metal hydroxide with a lithium compound to prepare an unfired mixture; and a calcining step of calcining the mixture to obtain the active material particles. In this case, the aqueous solution may contain at least one transition metal element that composes the lithium transition metal oxide.

This raw material hydroxide formation step may include a nucleation stage in which the transition metal hydroxide is precipitated from the transition metal solution and a particle growth stage in which the transition metal hydroxide is grown in a state where a pH of the transition metal solution is lowered from the nucleation stage.

In addition, in the raw material hydroxide formation step, the pH of the transition metal solution in the nucleation stage may be 12 to 13, and the pH of the transition metal solution in the particle growth stage may be 11 or higher and less than 12. Accordingly, in the transition metal hydroxide to become a precursor of the positive electrode active material particles 610, transition metal hydroxide particles in which a density of a vicinity of an outer surface is higher than an internal density can be obtained and the positive electrode active material particles 610 comprising a thin shell portion 612, a spacious hollow portion 614, and a through hole 616 can be obtained more stably.

At this point, furthermore, an ammonium ion concentration in the transition metal solution in the nucleation stage may be 20 g/L or lower, and the ammonium ion concentration in the transition metal solution in the particle growth stage may be 10 g/L or lower. Moreover, the ammonium ion concentration of the transition metal solution in the nucleation stage and the particle growth stage may be 3 g/L or higher.

In addition, this lithium-ion secondary battery 100 is characterized by the positive electrode active material particles 610. Granules of active material particles are used as the positive electrode active material particles 610. In this case, as shown in FIG. 9, the granules of the active material particles may comprise a shell portion 612 constituted by a lithium transition metal oxide, a hollow portion 614 enclosed by the shell portion 612, and a through hole 616 penetrating the shell portion 612. With the granules of these active material particles, in active material particles 610 included in the granules on average, a ratio of the hollow portion 614 among an apparent sectional area of the active material particles 610 is 23% or higher, and a thickness of the shell portion 612 is 2.2 μm or less. In this case, on an arbitrary cross section of the active material particles 610, a thickness of the shell portion 612 at an arbitrary position on an inner surface of the shell portion 612 is defined as a shortest distance from the arbitrary position on the inner surface of the shell portion 612 to an outer surface of the shell portion 612.

In addition, in the active material particles 610 included in the granules on average, the thickness of the shell portion may be 0.05 μm or more and, more favorably, 0.1 μm or more. Accordingly, since durability of the active material particles 610 is improved, the performance of the lithium-ion secondary battery 100 can be stabilized.

As described above, the lithium transition metal oxide may be a compound which has a layered structure and which contains nickel as a constituent element. In addition, the lithium transition metal oxide may be a compound which has a layered structure and which contains nickel, cobalt, and manganese as constituent elements. Alternatively, the lithium transition metal oxide may be a compound which has a layered structure and which is expressed as $Li_{1+x}Ni_yCo_zMn_{(1-y-z)}M_yO_2$, where $0 \leq x \leq 0.2$, $0.1 < y < 0.9$, $0.1 < z < 0.4$, and M denotes an additive. Furthermore, M may be at least one additive selected from the group consisting of Zr, W, Mg, Ca, Na, Fe, Cr, Zn, Si, Sn, Al, B, and F.

Moreover, a production method of the active material particles 610 comprises: a raw material hydroxide formation step of supplying ammonium ions to an aqueous solution of a transition metal compound, and precipitating particles of the transition metal hydroxide from the aqueous solution; a mixing step of mixing the transition metal hydroxide with a lithium compound to prepare an unfired mixture; and a calcining step of calcining the mixture to obtain the active material particles 610. In this case, the aqueous solution contains at least one transition metal element that composes the lithium transition metal oxide.

In addition, the raw material hydroxide formation step may include a nucleation stage in which the transition metal hydroxide is precipitated from the aqueous solution and a particle growth stage in which the transition metal hydroxide is grown in a state where a pH of the aqueous solution is lowered from the nucleation stage. Accordingly, active material particles 610 having a thin shell portion 612, a spacious hollow portion 614, and having a through hole 616 can be obtained in an efficient and stable manner.

A lithium-ion secondary battery, granules of active material particles, and a production method of the active material particles according to an embodiment of the present invention has been described above. However, the present invention is not limited to any of the embodiments above.

Figure 12:
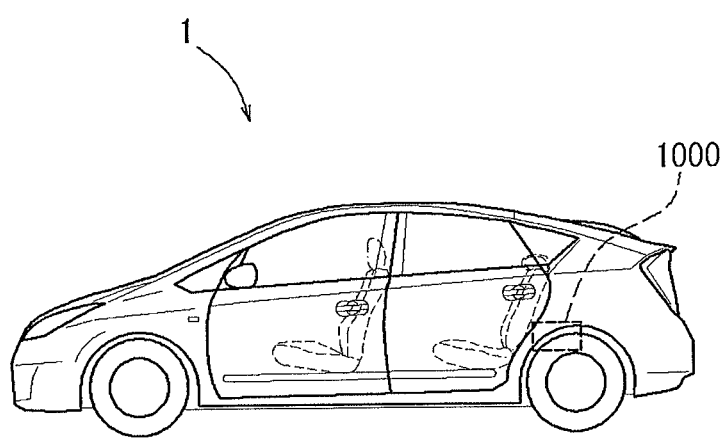
FIG. 12 is a diagram showing a vehicle mounted with a secondary battery.

As described above, the present invention contributes to improving output characteristics of a lithium-ion secondary battery. Therefore, the lithium-ion secondary battery according to the present invention is preferable as a secondary battery used as a vehicle drive power supply including a drive battery of a hybrid vehicle which is particularly required to have high-rate output characteristics and high-level cycling characteristics and drive batteries of a plug-in hybrid vehicle or an electrical vehicle which are particularly required to have high capacity. In this case, for example, as shown in FIG. 12, the secondary battery can be preferably used as a vehicle drive battery 1000 for driving a motor of a vehicle 1 such as an automobile in the form of an assembled battery in which a plurality of the secondary batteries are connected in series. Particularly, the lithium-ion secondary battery according to the present invention is capable of stably producing high output even when the amount of charge is low and can withstand use at lower amounts of charge. Therefore, the battery can be used efficiently and, at the same time, the number of batteries used can be reduced and cost can be cut even when a high level of capacity is required. As shown, the lithium-ion secondary battery 100 according to the present invention is particularly preferable as the vehicle drive battery 1000.

EXPLANATION OF REFERENCE NUMERALS 1 vehicle
100 lithium-ion secondary battery (evaluation battery)
200 wound electrode body
220 positive electrode sheet
221 positive electrode current collector
222 uncoated portion
223 positive electrode active material layer
224 intermediate portion
225 gap (cavities)
240 negative electrode
240 negative electrode sheet
241 negative electrode current collector
242 uncoated portion
243 negative electrode active material layer
245 gap (cavities)
262, 264 separator
280 electrolyte solution
290 charger
300 battery case
310, 312 gap
320 container main body
322 joint of lid and container main body
340 lid
350 inlet
352 sealing cap
360 safety valve
420 electrode terminal
420a tip
440 electrode terminal
440a tip
610 electrode active material particles
610 positive electrode active material particle
612 shell
612a inner surface of the shell portion
614 hollow part
616 through hole
620 electrically conductive material
630 binder
710 negative electrode active material
730 binder
1000 vehicle drive battery
WL winding axis

The invention claimed is:

1. A production method of active material particles, the method comprising:
a raw material hydroxide formation step of supplying ammonium ions to an aqueous solution of a transition metal compound to precipitate particles of a transition metal hydroxide from the aqueous solution, the aqueous solution containing at least one transition metal element that composes a lithium transition metal oxide;
a mixing step of mixing the transition metal hydroxide with a lithium compound to prepare an unfired mixture; and
a calcining step of calcining the mixture to obtain active material particles, wherein
the raw material hydroxide formation step includes:
a nucleation stage in which the transition metal hydroxide is precipitated from the aqueous solution; and
a particle growth stage in which the transition metal hydroxide is grown in a state where a pH of the aqueous solution is lowered from the nucleation stage, and wherein
the aqueous solution has a pH of 12 to 13 in the nucleation stage, and
the aqueous solution has a pH of 11 or higher and lower than 12 in the particle growth stage.

2. The production method of active material particles according to claim 1, wherein
the aqueous solution has an ammonium ion concentration of 20 g/L or lower in the nucleation stage, and
the aqueous solution has an ammonium ion concentration of 10 g/L or lower in the particle growth stage.

3. The production method of active material particles according to claim 2, wherein the aqueous solution has an ammonium ion concentration of 3 g/L or higher in the nucleation stage and the particle growth stage.

* * * * *